Jan. 15, 1963 W. S. DRUZ 3,073,892

CODE SIGNAL GENERATOR

Filed July 23, 1959 14 Sheets-Sheet 1

INVENTOR
Walter S. Druz
BY James E. Tracy
ATTORNEY

Jan. 15, 1963 W. S. DRUZ 3,073,892

CODE SIGNAL GENERATOR

Filed July 23, 1959 14 Sheets-Sheet 2

Jan. 15, 1963 W. S. DRUZ 3,073,892

CODE SIGNAL GENERATOR

Filed July 23, 1959 14 Sheets-Sheet 7

Jan. 15, 1963 W. S. DRUZ 3,073,892

CODE SIGNAL GENERATOR

Filed July 23, 1959 14 Sheets-Sheet 8

Jan. 15, 1963 W. S. DRUZ 3,073,892

CODE SIGNAL GENERATOR

Filed July 23, 1959 14 Sheets-Sheet 9

Jan. 15, 1963

W. S. DRUZ 3,073,892

CODE SIGNAL GENERATOR

Filed July 23, 1959

14 Sheets-Sheet 10

Jan. 15, 1963

W. S. DRUZ 3,073,892

CODE SIGNAL GENERATOR

Filed July 23, 1959

14 Sheets-Sheet 11

Jan. 15, 1963

W. S. DRUZ 3,073,892

CODE SIGNAL GENERATOR

Filed July 23, 1959

14 Sheets-Sheet 12

Jan. 15, 1963 W. S. DRUZ 3,073,892

CODE SIGNAL GENERATOR

Filed July 23, 1959 14 Sheets-Sheet 14

United States Patent Office 3,073,892
Patented Jan. 15, 1963

3,073,892

CODE SIGNAL GENERATOR

Walter S. Druz, Bensenville, Ill., assignor to Zenith Radio Corporation, a corporation of Delaware Filed July 23, 1959, Ser. No. 829,103
22 Claims. (Cl. 178—5.1)

This invention pertains to a code signal generator for producing a code signal for a secrecy communication system to establish the system in a selected one of several possible operating states as determined by the code pattern of the code signal. The invention has particular application to a distortion problem which may be encountered in a subscription television system and will be described in that environment.

The code signal may be utilized in either a transmitter or receiver.

Secrecy systems have been proposed in which an intelligence signal, for example an audio signal, is coded by altering some characteristic thereof, such as phase, at spaced time intervals determined by a coding schedule made known only to authorized receivers. Most such systems do effect adequate coding or scrambling of the intelligence signal but the signal, as coded, may have a D.C. component in addition to an A.C. component. Most transmitters of conventional design are not capable of transmitting a D.C. component so that only the A.C. portion of the coded signal is radiated. When the A.C. component alone is applied to the decoding apparatus of the receiver and the output therefrom is utilized to operate a sound reproducer, distortion results. Such distortion is inevitable unless the decoder operates upon the same signal as that produced by the coder at the transmitter, and the necessary identity of signals is destroyed when the transmitter radiates less than all components of the coded intelligence signal. This identity may also be destroyed in the receiver if its coupling networks do not translate the low frequency components of the received signal.

Of course, it is theoretically possible to employ a perfect, carefully designed, D.C. modulator in a transmitter, such as in a frequency modulated audio transmitter, that has a high degree of stability. Moreover, a perfect frequency detector may be used at the receiver to reproduce the D.C. component. If the circuits are not absolutely stable in operation, however, objectionable frequency drift results. As a consequence, it is impractical to transmit and reproduce a D.C. component of a coded intelligence signal in this manner.

One arrangement for overcoming this problem is disclosed and claimed in copending application Serial No. 513,757, filed June 7, 1955, and issued February 3, 1959, as Patent 2,872,507, in the name of Walter S. Druz, and assigned to the present assignee. There a system is suggested for transmitting and reproducing the D.C. component as well as the A.C. component of an audio signal which has been coded by inverting the phase thereof from time to time in accordance with a code schedule. The Druz arrangement avoids the distortion otherwise introduced during the decoding process when the D.C. component is not conveyed. Briefly, the D.C. compoent is amplitude modulated on a sub-carrier at the transmitter, preferably in a suppressed carrier modulator, and then both the A.C. component and the D.C. modulated sub-carrier are frequency modulated on a main carrier for transmission to a receiver. The main carrier wave is first demodulated at the receiver to recover the A.C. component and the D.C. modulated sub-carrier and subsequently the D.C. component is derived by means of a second demodulator such as a synchronous detector. The A.C. and D.C. components are then both employed in the decoding process to develop a signal which corresponds to the original uncoded audio signal.

Copending application Serial No. 513,868, also filed June 7, 1955, and issued October 27, 1959, as Patent 2,910,527, in the name of Adrian J. De Vries, and assigned to the present assignee, discloses another arrangement for translating a D.C. or very low frequency component of an intelligence signal to preclude distortion. In short, the receiver of the De Vries arrangement utilizes the same type transmission as the Druz system—namely, a carrier which is modulated by a complex wave form comprising the A.C. component of the coded audio and a sub-carrier modulated in accordance with the D.C. component of the coded audio. The complex wave form is phase inverted in synchronism with phase changes at the transmitter to produce a composite signal including the sub-carrier with certain amplitude peaks of the sub-carrier representing the uncoded audio signal free of distortion. Those peaks are sampled to develop an output signal containing the sampled portions and by shaping it in a low pass filter the original uncoded signal is simulated.

While the systems of both Druz and De Vries do eliminate the distortion otherwise present when the D.C. component of the coded intelligence is not reproduced in the receiver, such systems do exhibit the obvious disadvantage that special circuitry is required at each receiver. In accordance with the present invention such distortion is eliminated by establishing a code schedule, namely, the time intervals during which phase inversion of the audio occurs, such that the D.C. component resulting in the coded audio is made as small as possible so that it is of negligible effect.

Accordingly, it is an object of this invention to provide a novel code signal generator for producing a code signal which when utilized to code an intelligence signal results in a coded intelligence signal having a minimum D.C. component.

It is another object of the present invention to provide a code signal generator for achieving the results of either of the previous Druz or De Vries arrangements without requiring additional special equipment at each receiver as is the case in those prior systems.

It is a further object of the invention to provide a code signal generator for producing a code signal which may be utilized to code an intelligence signal to procude a coded intelligence signal which is relatively free of distortion.

It is another object to provide a code generator for effectively selecting the manner in which an intelligence signal is coded to develop a coded intelligence signal exhibiting a characteristic having a value closest to a predetermined reference value, where the value of the characteristic is different when the intelligence signal is coded differently.

It is still another object of the invention to provide an arrangement for selecting from several differently coded intelligence signals, each of which has been coded in accordance with a respective one of several operating states and each of which contains a common signal component, such as a D.C. component, having a predetermined magnitude, the particular coded intelligence signal which contains the common signal component having a magnitude closest to a predetermined reference magnitude but of opposite polarity with respect thereto.

An additional object is to provide a method for producing from a given time segment of an uncoded intelligence signal a coded intelligence signal coded in accordance with a selected one of several possible operating states and containing a minimum D.C. component.

A code signal generator, constructed in accordance with the invention, produces a code signal for a secrecy communication system to establish the system in a selected one of several possible operating states as determined by the code pattern of the code signal. The generator comprises a source of intelligence signal and means for developing several different control signals each of which represents an assigned one of the several operating states of the system. Means are provided for simultaneously utilizing the control signals to code the intelligence signal to develop several differently coded intelligence signals each of which is coded in accordance with a respective one of the operating states and each of which contains a corresponding characteristic or signal component having a unique predetermined magnitude-polarity condition. The generator has means for determining which of the coded intelligence signals contains the common signal component having a magnitude closest to a predetermined reference magnitude but of opposite polarity with respect thereto to provide a control effect represening the selected coded intelligence signal. Finally, the generator includes means for utilizing the control effect to develop a code signal having a code pattern representing the operating state according to which the selected coded intelligence signal is coded.

The features of this invention which are believed to be new are set forth with particularity in the appended claims. The invention, together with further objects and advantages thereof, may best be understood, however, by reference to the following description taken in conjunction with the accompanying drawings, in which:

Figure 1:
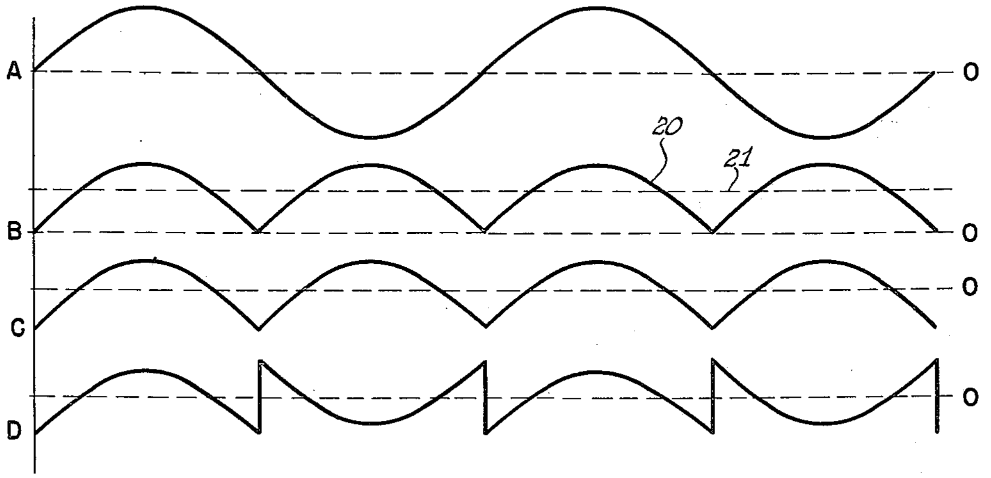
FIGURE 1 is an idealized graphical representation of a series of wave forms illustrating the penomenon which gives rise to distortion in a particular type of audio coding system.

Before considering the structural and operational details of the illustrated embodiment of the invention, it might prove helpful to discuss the D.C. component which arises from a particular manner of coding an audio signal and the distortion which this component may introduce into the decoded audio signal.

In accordance with one effective audio scrambling technique, the phase of the audio signal is inverted from time to time as determined by amplitude changes of a control signal of square wave shape. The control signal may be phase modulated about a mean frequency to increase the security of the system. Phase modulation of the periodically varying square wave is achieved by interrupting or disrupting the periodic pattern from time to time during spaced state-determining intervals in accordance with a code schedule so that the phase of the control signal is changed from one to another of the intervening time intervals as between several possible operating states or phase conditions.

In a known subscription television system, this type of control signal is developed by employing a cyclic counting mechanism, comprising an 8:1 blocking oscillator and a bi-stable multivibrator, which is actuated in response to line-drive pulses to develop a square wave control signal having amplitude changes after each series of eight line-trace intervals and thus exhibiting a frequency of approximately 1000 cycles per second. During a portion of each field-retrace interval, which may be termed a "state-determining interval," a combination of randomly sequenced code signal bursts, individually having a predetermined identifying frequency, is developed, and by means of an adjustable switching mechanism, these various bursts are segregated from one another and utilized to supply actuating pulses to selected input circuits of the 8:1 blocking oscillator and the bi-stable multivibrator in the counting mechanism. The application pattern of these actuating pulses is determined by the adjustment of the switching mechanism and this is made known only to authorized subscribers.

With this arrangement, the pulses selectively trigger the blocking oscillator and multivibrator in a prescribed random or irregular sequence determined by the code bursts to disrupt or interrupt the normal cyclic actuation of the counting mechanism during the state-determining or field-retrace intervals in accordance with a secret code schedule and rephase the square wave control signal developed thereby to a selected one of several, specifically sixteen, possible operating states or phase conditions. Consequently, the control signal produced in the counting mechanism exhibits periodic amplitude variations during the field-trace intervals, due to the cyclic operation of the counting mechanism, and random variations during the state-determining or field-retrace intervals, due to the action of the code bursts.

It has been found experimentally that phase inversion of the audio signal at the rate of approximately 2,000 times per second, which is realized by the utilization of such a phase modulated control signal (there being two phase inversions per cycle), achieves very effective sound coding in that intelligibility is substantially completely destroyed. However, it has also been found that when a control signal of square wave form having a frequency in the audio spectrum is employed to determine the times of phase inversion, the coded audio signal has a D.C. component which leads to undesirable distortion in the decoded or unscrambled audio signal reproduced by subscriber receivers.

Consider, for example, the sine wave of curve A in FIGURE 1 and assume it to represent an audio signal having a frequency of 1,000 cycles per second. If that signal is subjected to phase inversions determined by the amplitude excursions of a 1,000 cycle square wave control signal and it should happen that the inversions occur at the zero points in each cycle, where the wave form crosses the zero reference axis, the coded audio signal of curve B results. This signal is similar to that developed by a full wave rectifier and has an A.C. component 20 as well as a D.C. or unidirectional component represented by the dashed construction line 21.

When the coded signal of curve B is transmitted by means of conventional transmitter equipment, the D.C. component may be lost or it may be lost through the use of A.C. coupling networks in the receiver, leaving in either event only the A.C. component of curve C for application to the decoding circuit. It will be noted that the zero signal points in curve B are points of considerable negative potential in curve C. When the signal of curve C is subjected to a decoding function at the receiver, it undergoes phase inversions complementary to those to which the audio signal has been subjected at the transmitter. Each time a phase inversion takes place, the signal is at a level other than zero potential and the distorted wave form of curve D obtains. Such distortion gives rise to an objectionable "ping" in the reproduced audio and is attributable to the fact that D.C. component 21 of the coded signal of curve B has not been successfully translated and employed in reconstituting the intelligence in uncoded form. Of course, any variation in frequency between that of the instantaneous audio signal and the control signal also produces ping of varying degrees; in fact, whenever a phase inversion occurs at a time other than those corresponding to the peaks in the audio signal cycle, distortion results.

It will be appreciated that if the operating state of the previously described subscription television system is adjusted during each field-retrace interval so that the phase condition of the square wave is such that the amplitude excursions occurring throughout the immediately succeeding field-trace interval occur at times when the audio signal is passing through a peak or at least at an amplitude very close to a peak, considerably less ping is generated than that which is developed when the phase condition of the square wave is determined strictly at random during each field-retrace interval. The present invention achieves the result of actually "programming" the code schedule so that the transmitted coded audio signal contains a minimum D.C. or ping component.

Turning now to the structural description of FIGURES 2–5, a transmitter embodying the invention comprises a conventional synchronizing-signal generator 24 (FIGURE 2) which has one output circuit 1000 connected to a mono-stable multivibrator 25 to supply vertical or field-drive pulses thereto and another output circuit 2000 connected to one input circuit of a normally-closed gate circuit 26 to provide line-drive pulses thereto. The output terminals of multivibrator 25 are connected to a mono-stable multivibrator 27 which in turn is connected to another input circuit of gate 26. The output terminals of gate 26 are connected to a timing pulse generator 29 which may take the form of a well known ring counter in that it may have a multiplicity of stable operating conditions and may be advanced from one condition to the next in response to successively applied pulses. Specifically, generator 29 has eight stable operating conditions. A typical ring counter of this type is shown and described in detail on page 24 of "High-Speed Computing Devices" by the staff of Engineering Research Associates, Inc., and published by McGraw-Hill Book Company, Inc., in 1950. The ring counter disclosed in that publication has a multiplicity of intercoupled electron-discharge paths to form a corresponding multiplicity of operating stages and operates in response to applied actuating pulses for rendering these paths conductive one at a time in a predetermined sequence.

Generator 29 has a series of output conductors 31–38 connected to the reset inputs of respective ones of a series of 8:1 blocking oscillators 41–48. Each of conductors 31–38 is connected to the output of an assigned one of the stages in the ring counter, constituting the timing pulse generator 29, to receive a pulse when the assigned stage is triggered. Each of blocking oscillators 41!48 has its counting input circuit connected to synchronizing-signal generator 24 to receive line-drive pulses therefrom. The output terminals of blocking oscillators 41–48 are connected respectively to the input terminals of a series of bi-stable multivibrators 51–58, each of which multivibrators also has an input circuit connected to the output of a mono-stable multivibrator 59 which has its input terminals connected to the output circuit of multivibrator 25. Each of multivibrators 51–58 may be of conventional construction and may contain a pair of cross-coupled triodes.

Each of multivibrators 51–58 has two output circuits, individually connected to the anode of an assigned one of the two triodes, to provide output signals of opposed phases. One output circuit of multivibrator 51 is connected to the input circuit of a normally-open gate 61 and the other output circuit is connected to a normally-open gate 62. Similarly, the two output circuits of multivibrator 52 are connected respectively to the input circuits of normally-open gate circuits 63 and 64, the outputs of multivibrator 53 are connected to the inputs of normally-open gates 65 and 66, the output circuits of multivibrator 54 are connected to normally-open gate circuits 67 and 68, the output terminals of multivibrator 55 are connected to the input terminals of normally-open gates 69 and 70, the outputs of multivibrator 56 are connected to the input terminals of normally-open gate circuits 71 and 72, the two output circuits of multivibrator 57 are connected to the input circuits of a pair of normally-open gates 73 and 74, and the two output circuits of multivibrator 58 are connected respectively to the inputs of normally-open gate circuits 75 and 76. For a reason to become apparent, the output leads from multivibrators 57 and 58 are reversed or transposed at the anodes of their respective triodes, with respect to the output connections from multivibrators 51–56 inclusive.

A mono-stable multivibrator 77 is connected to synchronizing-signal generator 24 to receive field-drive pulses therefrom and the output from multivibrator 77 is connected to a mono-stable multivibrator 78 which in turn is connected to a separate input circuit of each of normally-open gate circuits 61–76. The output terminals of gate circuits 61–76 are connected to respective ones of a series of coders 71, 79, 72, 80, 73, 81, 74, 82, 75, 83, 76, 84, 77, 85, 78, 86, each of these coders having another input circuit connected to an audio signal source 87 which may comprise a microphone and audio amplifier in order to pick up and amplify the sound information accompanying the video information of a telecast.

Each of coders 71–86 may be similar to that which is disclosed in the copending Druz application, Serial No. 513,757, and may comprise a phase splitter and an electronic selector switch. The phase splitter supplies an audio signal from source 87 to the electronic selector switch in push-pull relationship, namely, with two different phases 180° apart, and a square wave control signal is applied to the selector, as explained hereinafter, to select certain portions of each of the two signals from the phase splitter. With this arrangement, the phase of the audio signal is effectively inverted each time the selector is actuated, and this occurs each time there is an amplitude variation of the control signal.

The output circuits of coders 71–86 are connected to respective ones of a series of control circuits 91–106 (FIGURE 3) which in turn are connected to respective ones of a series of blocking oscillators 111–126. Synchronizing-signal generator 24 is connected to a mono-stable multivibrator 127 to supply field-drive pulses thereto, and the output of multivibrator 127 is connected to the input of a mono-stable multivibrator 128, the output circuit 4000 of which in turn is connected to a triangular wave generator 129 and also through a delay line 130 to a mono-stable multivibrator 131. The output of generator 129 is connected to an input circuit of each of control circuits 91–106, and the output of mono-stable multivibrator 131 is also connected to separate input circuits of each of control circuits 91–106.

A pair of output terminals of each of the control circuits are connected across a storage condenser 133 which in turn is connected across the input of a D.C. buffer amplifier 134. A pair of input terminals of a sampler 135 is connected to buffer amplifier 134, and another pair of input terminals of sampler 135 are connected to the output of a mono-stable multivibrator 136, the input circuit of which is connected to the output of multivibrator 128. The output of sampler 135 is connected to a D.C. buffer amplifier 137 by means including a shunt-connected storage condenser 138, and the output of the buffer amplifier is connected to a separate input circuit of each of control circuits 91–106 by way of a shunt-connected load resistor 139.

Blocking oscillators 111–126 are coupled by means of series-connected diodes 141–156, respectively, to a common input circuit of triangular wave generator 129. Oscillators 111–126 are also connected to the input circuits of respective ones of a series of binary circuits 161–176 which are connected together to form a conventional open ring such that only one of the binaries is actuated at a time from its instantaneous operating condition to its other condition. In this way, if pulses are applied to two or more of the binaries simultaneously, only one of them will be triggered to its opposite condition. The output terminals of binaries 161–176 are connected to respective ones of a series of normally-closed gate circuits 181–196, each of these gates also having a separate input circuit connected to the output terminals of delay line 130. The output circuits of normally-closed gates 181–196 are connected respectively to a series of mono-stable multivibrators 201–216 (FIGURE 4) and also to separate input circuits of respective ones of control circuits 91–106.

Digressing for the moment to FIGURE 8, a typical one of control circuits 91–106 will be described in detail. For illustrative purposes, it will be assumed that control circuit 95 is shown. Portions of FIGURE 3 have also been included in FIGURE 8 to illustrate the manner in which control circuit 95 operates. The output of coder 75 is coupled through a series-connected resistor 217 and a shunt-connected storage condenser 218 to the input circuit of a D.C. amplifier 219 comprising an even number of amplifying stages so that no phase reversal is introduced. Condenser 218 is also coupled across the input terminals of a discharge switch 220 which normally presents an open circuit to the condenser. Another input circuit of switch 220 is connected to mono-stable multivibrator 131 to receive from time to time an actuating signal to close the switch and short circuit condenser 218 for discharging purposes. The output of amplifier 219 is coupled through a shunt-connected resistor 222 and a series-connected resistor 223 to the cathode 224 of a diode 225, the anode 226 of the diode being connected to ground through a resistor 227. Cathode 224 is also connected through a series resistor 228 to the cathode 229 of a diode 230, the anode 231 of the diode being grounded. Cathode 229 is connected through a resistor 233 to the cathode 234 of a diode 235, the anode 236 of which is connected to ground through a resistor 237. A D.C. buffer amplifier 238 connects anode 226 of diode 225 to anode 236 of diode 235. Cathode 234 is coupled through a series-connected condenser 240 and a shunt-connected resistor 241 to an amplifier 242 which is connected to blocking oscillator 115.

Triangular wave generator 129 is coupled to anode 236 of diode 235 through a series-connected condenser 243. The junction of cathode 224 with resistors 223 and 228 is connected to the input circuit of a sampler 245, the output terminals of which are connected across storage condenser 133. The output of buffer amplifier 137 is connected through a series resistor 247 to the junction of resistors 223 and 228, cathode 224, and the input of sampler 245. Sampler 245 has another input circuit coupled to the output of normally-closed gate circuit 185.

Figure 3:
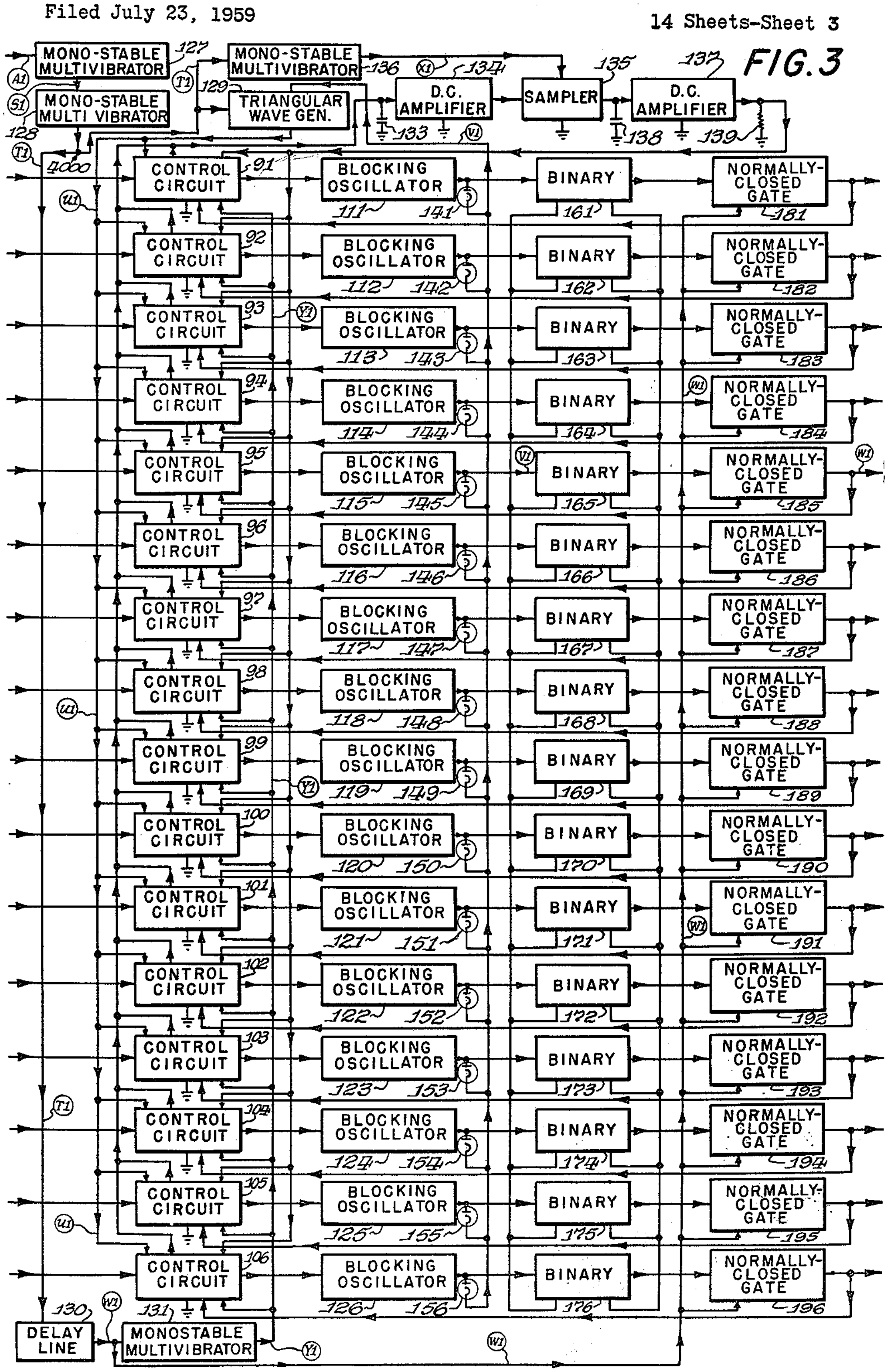
Figure 8:
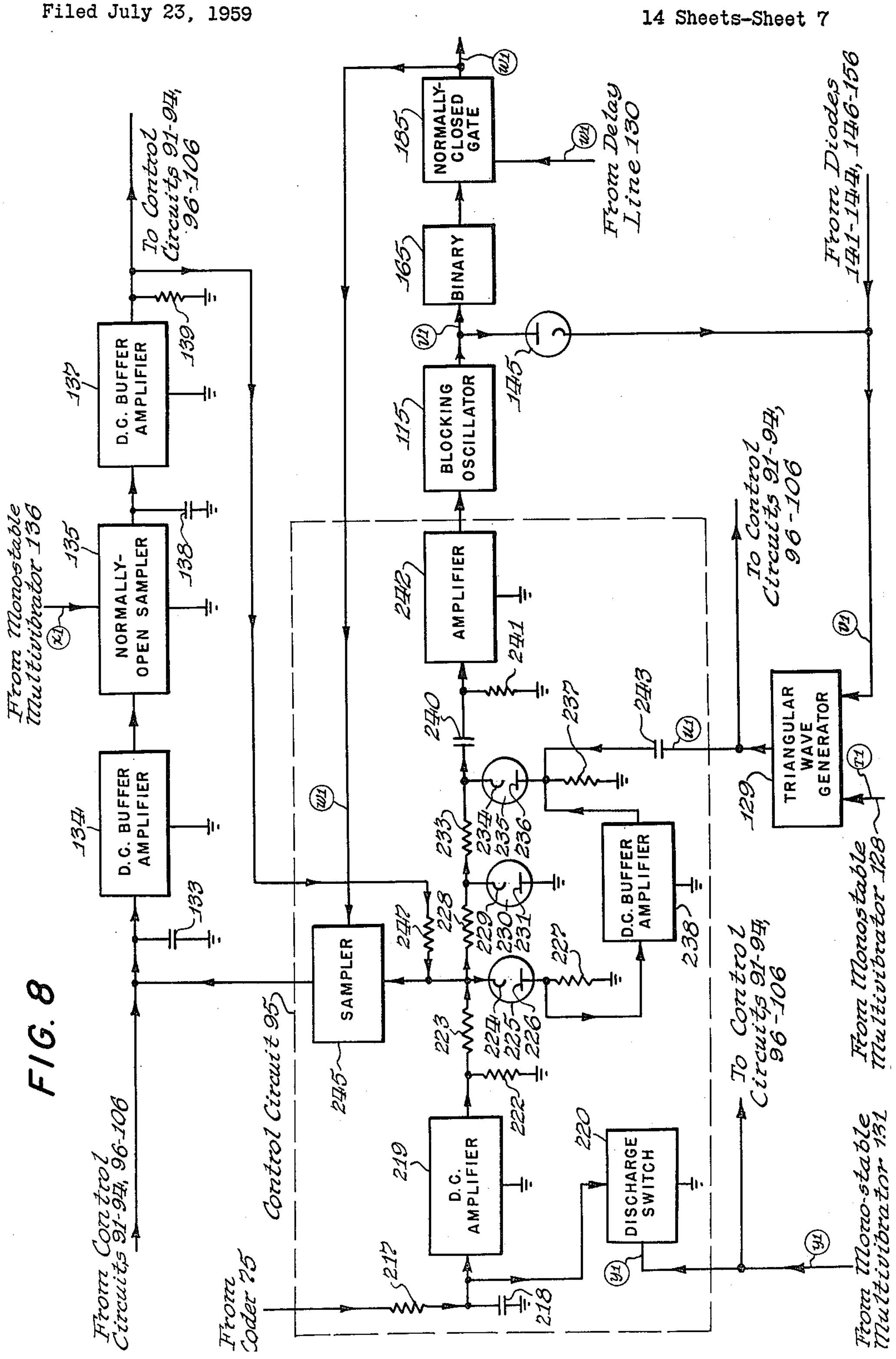
FIGURE 8 is a more detailed schematic representation of a portion of FIGURE 3.

Control circuit 95 of FIGURE 3 includes all of the apparatus enclosed within the correspondingly designated dashed construction line in FIGURE 8. The remaining control circuits 91–94 and 96–106 are identical in construction. Elements 133–135, 137–139, and 129 are common to all of the control circuits. A sampler in each of control circuits 91–94 and 96–106 corresponding to sampler 245 is coupled across storage condenser 133. Similarly, buffer amplifier 137 is connected to similar resistors 247 in the remaining control circuits. The output of triangular wave generator 129 is connected to similar condensers 243 in each of control circuits 91–94 and 96–106.

Returning now to FIGURE 4, the output terminals of multivibrators 201–208 are connected respectively to input circuits of a series of normally-closed gate circuits 251–258. Multivibrators 209–216 are also connected to separate input circuits of gates 251–258, respectively. Additionally, the output circuits of multivibrators 202–209 are connected to separate inputs of an OR gate 259, and multivibrators 201 and 210–216 are connected to separate inputs of an OR gate 260. OR gates 259 and 260 are constructed in well known manner, as shown and described, for example, on page 394 of "Pulse and Digital Circuits," published by McGraw-Hill Book Co., Inc., 1956, and serve as unidirectional mixers or matrices; an input signal on any one of the multiplicity of input circuits of each matrix is translated to the output circuit.

A mono-stable multivibrator 261 is connected to output circuit 1000 of sync generator 24 to derive vertical drive pulses, and the output circuit 3000 of multivibrator 261 is connected through a mono-stable multivibrator 262 to one pair of input terminals of a normally-closed gate circuit 263, another pair of input terminals thereof being connected to output circuit 2000 of sync generator 24 to receive line-drive pulses therefrom. The output circuit of gate 263 is connected to the input terminals of a timing pulse generator 265 that may take the same form as timing pulse generator 29 in FIGURE 2. Specifically, it may consist of a conventional ring counter having eight stages resulting in eight stable operating conditions and is switched from one condition to the next in response to successively applied input pulses. Generator 265 has a series of eight output circuits 271–278 each of which is connected to an assigned one of its eight stages to receive a pulse when the generator is triggered to the associated condition. Output circuits 271–278 are connected respectively to separate input circuits of normally-closed gate circuits 251–258.

The output terminals of gates 251–258 are connected in common to the reset input circuit of an 8:1 blocking oscillator 279 (FIGURE 5) which has its counting input circuit connected to output circuit 2000 of synchronizing-signal generator 24 to receive line-drive pulses. The output of oscillator 279 is connected to an input circuit of a conventional bi-stable multivibrator 280 which comprises two cross-coupled triodes (not shown) and which is triggered from one to the other of its two stable operating conditions to render the triodes conductive in alternation in response to successively applied pulses from oscillator 279. Multivibrator 280 has one "reset" input circuit designated $R_1$ which triggers the multivibrator to a predetermined one of its two stable conditions in response to pulses applied to that input circuit and has another "reset" input circuit labeled $R_2$ which triggers the multivibrator to its other stable operating condition in response to pulses applied thereto. A third or "common" input circuit designated C is connected in common to both input circuits $R_1$ and $R_2$ in order to actuate the multivibrator from its instantaneous condition to its opposite condition, whatever one that may be, responsive to applied pulses over input C. The output of oscillator 279 is connected to input C of multivibrator 280.

A delay line 282 (FIGURE 5) is connected to output circuit 2000 of sync generator 24 to receive line-drive pulses and has its output circuit connected to one input of a random pulse generator 284. A mono-stable multivibrator 285 has its input circuit connected to output circuit 3000 of multivibrator 261 (FIGURE 4) and its output terminals connected to another input circuit of random generator 284, and a mono-stable multivibrator 286 is coupled between the output of blocking oscillator 279 and still another input circuit of generator 284. Random pulse generator 284 may be similar in construction to apparatus disclosed and claimed in copending application Serial No. 463,702, filed October 21, 1954, and issued August 2, 1960, as Patent 2,947,804, in the name of Eilers et al., and assigned to the present assignee. When energized it operates in response to pulses applied over one input circuit (that from delay line 282) and supplies each one of those input pulses without any substantial time delay to one of a series of output circuits 287–292 selected at random. Conductors 287–292 are connected respectively to a series of normally-open gate circuits 293–298.

Figure 4:
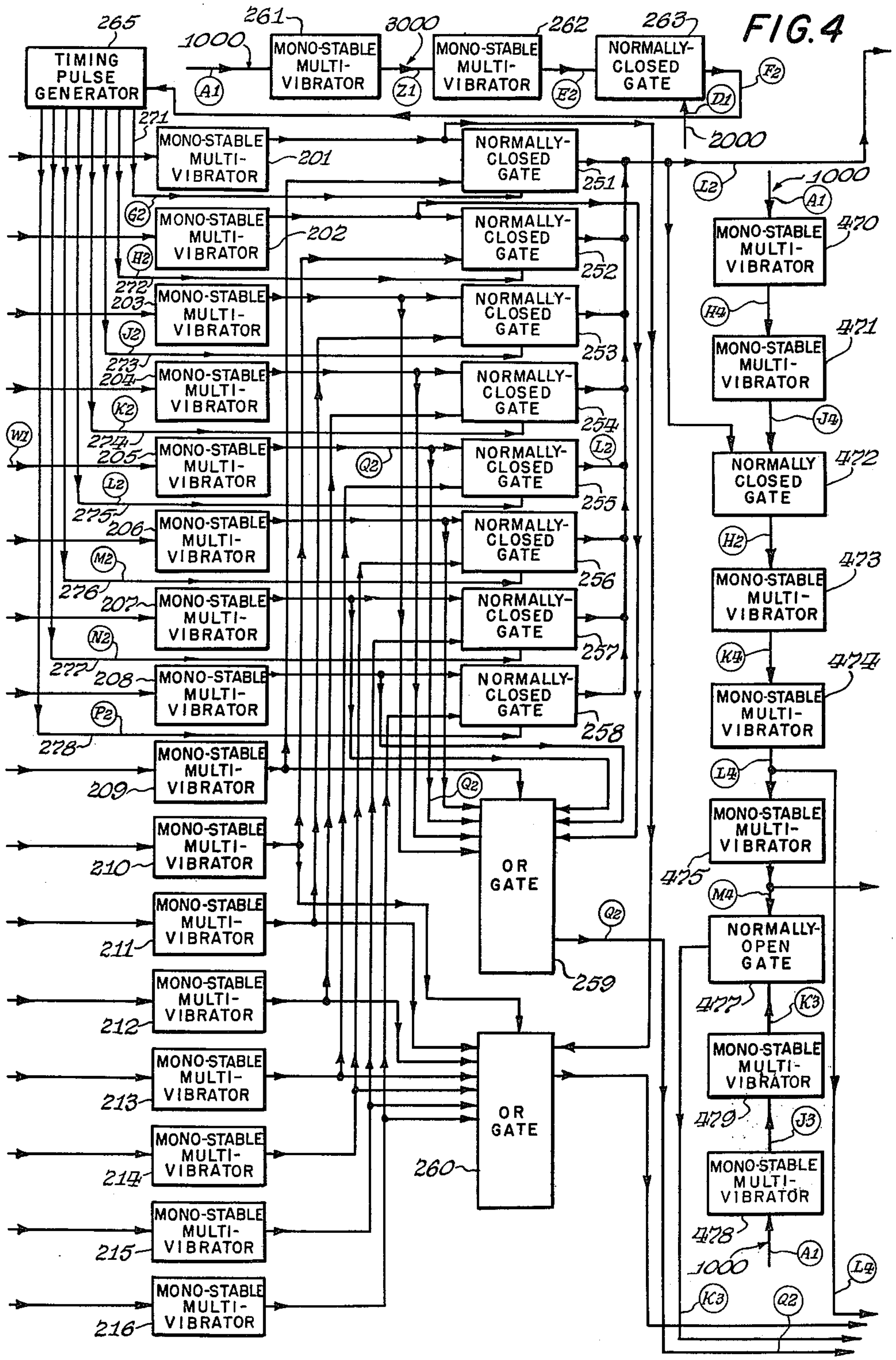
Figure 5:
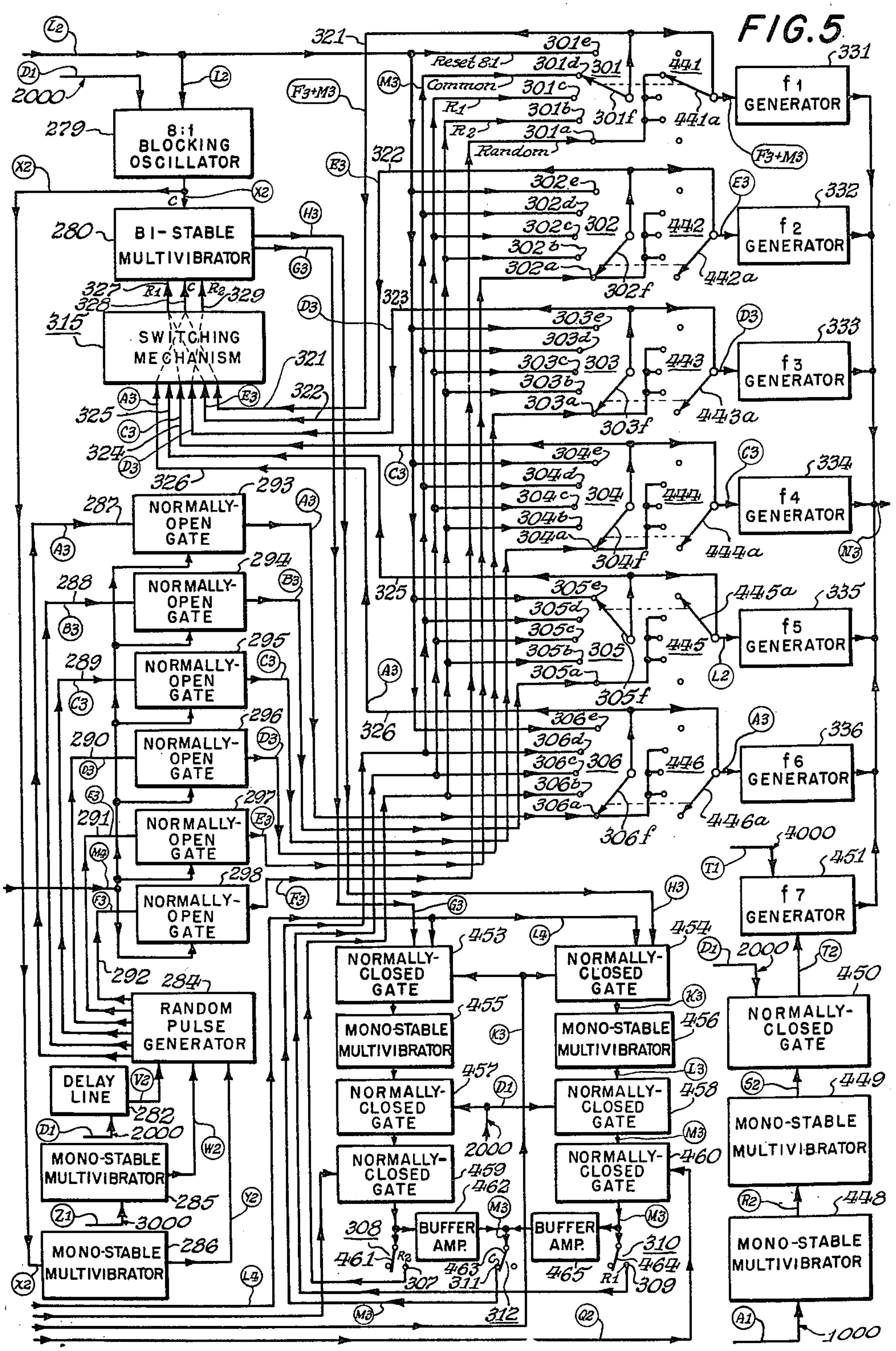

The output circuits of gates 293–298 are connected respectively to stationary contacts 306a–301a, each of which contacts is associated with a different respective one of a series of five-position rotary switches 306–301. Each of switches 301–305 has four other stationary contacts 301b–301e, 302b–302e, 303b–303e, 304b–304e, 305b–305e, and 306b–306e, respectively. All of the b contacts are connected together and then to the stationary element 307 of a single-pole single-throw switch 308. Similarly, all of the c contacts are connected in common to a stationary contact 309 of a single-pole single-throw switch 310, and all of the d contacts of switches 301–306 are connected together and to a stationary contact 311 of a single-pole single-throw switch 312. The e contacts of switches 301–306 are joined together and connected to the common output of gates 251–258 (FIGURE 4).

The movable contacts 301f, 302f, 303f, 304f, 305f, 306f, of switches 301–306, respectively, are connected to a series of input terminals of a switching mechanism 315 via conductors 321–326, respectively. Switching mechanism 315 has three output circuits 327–329 which are connected to the input circuits $R_1$, C and $R_2$, respectively, of bi-stable multivibrator 280. Switching mechanism 315 is provided to establish any selected one of a multiplicity of possible interconnection patterns between its input circuits 321–326 and its output circuits 327–329. Movable contacts 301f–306f are also connected to respective ones of a series of generators 331–336, the output circuits of which are connected in common. These generators, when energized, produce signal bursts of distinctive frequencies, generator 331 producing a signal of frequency designated $f_1$, generator 332 producing a signal of frequency $f_2$, and generators 333–336 producing bursts of frequencies $f_3$–$f_6$ respectively.

Movable contacts 301f–306f are also individually connected to the movable contacts 441a–446a of a series of five-position rotary switches 441–446, respectively. The two extreme stationary contacts of each of switches 441–446 are left open (not connected to any other circuit) whereas the middle three strationary contacts of each switch are joined together and then connected to the a contact of its associated one of switches 301–306. Movable contacts 301f and 441a are ganged for unicontrol action as shown by the dashed construction line therebetween. Similarly, contacts 302f and 442a, 303f and 443a, 304f and 444a, 305f and 445a, and 306f and 446a are individually ganged, as shown by the dashed construction lines, for simultaneous operation.

A mono-stable multivibrator 448 is connected to output circuit 1000 of synchronizing-signal generator 24 to derive vertical drive pulses, and the output terminals of the multivibrator are connected through a mono-stable multivibrator 449 to one input circuit of a normally-closed gate circuit 450, the gate having another input circuit connected to output circuit 2000 of sync generator 24 to derive line-drive pulses therefrom. The output of gate 450 is connected to one input circuit of a generator 451 which when energized produces a signal burst of a distinctive frequency $f_7$. Generator 451 also has another input circuit connected to the output circuit 4000 of multivibrator 128 (FIGURE 3), and the output of generator 451 is connected to the common output circuit of generators 331–336.

As stated before, bi-stable multivibrator 280 is conventional in construction and comprises two cross-coupled triodes. Two separate output circuits are connected to respective ones of the two anodes of the two triodes, and these output circuits are connected to a pair of normally-closed gate circuits 453, 454. The output terminals of gates 453 and 454 are connected through respective ones of mono-stable multivibrators 455 and 456 to respective ones of a pair of normally-closed gate circuits 457, 458, which gates have further input circuits connected to output circuit 2000 of sync generator 24 to receive line-drive pulses. The output circuits of gates 457, 458 are connected to a pair of normally-closed gate circuits 459, 460, respectively, gate 459 having another input circuit connected to the output terminals of OR gate 260 and gate 460 having another input circuit connected to the output terminals of OR gate 259. The output circuit of gate 459 is connected to the movable contact 461 of single-pole single-throw switch 308 and also through a buffer amplifier 462 to the movable contact 463 of single-pole single-throw switch 312. The output circuit of gate 460 is connected to the movable contact 464 of single-pole single-throw switch 310 and also through a buffer amplifier 465 to movable contact 463 of switch 312.

A mono-stable multivibrator 470 (FIGURE 4) is connected to output circuit 1000 of synchronizing-signal generator 24 to receive field-drive pulses, and the output of multivibrator 470 is connected to a mono-stable multivibrator 471 whose output circuit is connected to an input circuit of a normally-closed gate circuit 472 which has another input circuit connected to the common output from gates 251–258. The output terminals of gate 472 are connected to a mono-stable multivibrator 473 which is connected to the input terminals of a mono-stable multivibrator 474. Multivibrator 474 in turn is connected to separate input circuits of normally-closed gate circuits 453 and 454 (FIGURE 5), and also to the input circuit of an additional mono-stable multivibrator 475. The output terminals of this multivibrator are connected to separate input circuits of each of gates 293–298 and also to the input terminals of a normally-open gate circuit 477. A mono-stable multivibrator 478 has its input circuit connected to output circuit 1000 of synchronizing-signal generator 24 to receive field-drive pulses and has its output circuit connected to a mono-stable multivibrator 479 which in turn is connected to another input circuit of gate 477. The output terminals of this gate are connected to separate input circuits of gates 453 and 454.

Figure 6:
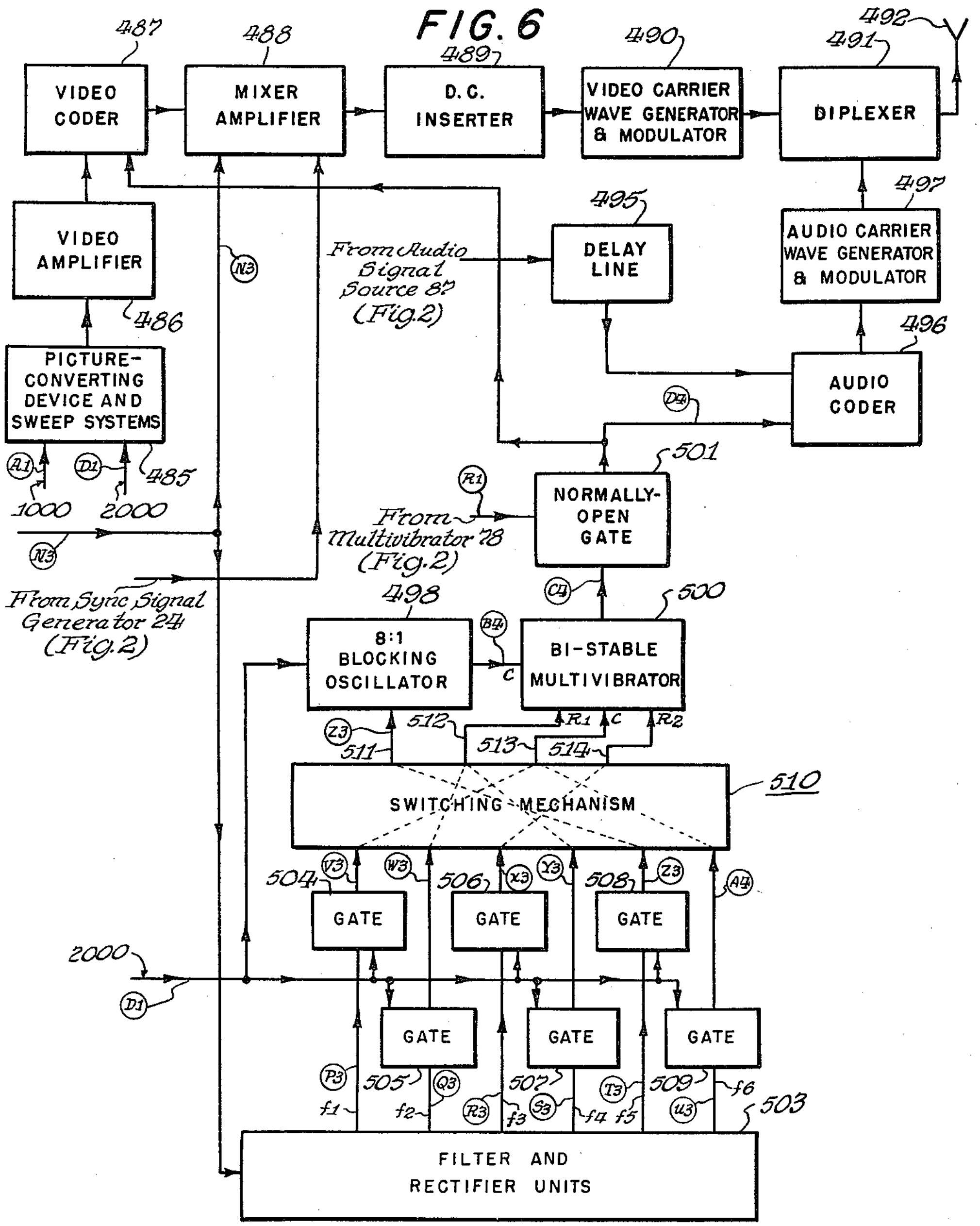
Figure 7:
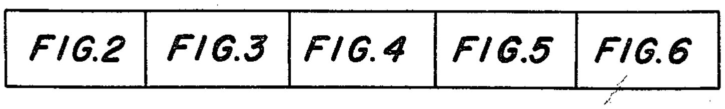
FIGURE 7 is a layout diagram illustrating the manner in which FIGURES 2–6 should be physically arranged to display the entire transmitter.

The circuitry described thus far constitutes the code signal generator portion of the transmitter. In FIGURE 6, a unit 485, which includes a conventional picture converting or pick-up camera tube for deriving a video signal representing an image to be televised and also includes the usual sweep systems, has separate input circuits connected to output circuits 1000 and 2000 of sync generator 24 to receive the field- and line-drive pulses and an output circuit connected to a video amplifier 486. The output terminals of this amplifier are connected to a video coder 487 which is coupled to one pair of input terminals of a mixer amplifier 488. Video coder 487 may be constructed in the manner disclosed and claimed in Patent 2,758,153, issued August 7, 1956, in the name of Robert Adler, and assigned to the present assignee. As shown in the Adler patent, coder 487 may comprise a beam-deflection tube having a pair of output circuits which may be selectively introduced into the video channel as the electron beam of the tube is deflected from one to the other of two beam-receiving anodes coupled to such output circuits. One of these includes a time delay network so that the timing of the video components relative to the synchronizing components of the radiated signal varies as the beam of the deflection tube is switched between its anodes. This switching effect is accomplished by means of a beam-deflection control or actuating signal applied to a pair of deflection electrodes of video coder 487. The introduction of such intermittent variations in the relative timing of the video and synchronizing components effectively codes the picture information since conventional television receivers, not equipped with suitable decoding apparatus, depend upon an invariant time relation between the video and synchronizing components of a received signal to reproduce the image intelligence represented thereby.

Mixer amplifier 488 is coupled to a direct-current inserter 489 and thence to a video carrier wave generator and modulator 490 which, in turn, is connected through a diplexer 491 to an antenna 492. Mixer amplifier 488 is also connected to synchronizing-signal generator 24 to receive the usual field- and line-synchronizing components and associated pedestal components. Audio signal source 87 which comprises a microphone and an audio amplifier, as described hereinbefore, is coupled through a delay line 495, which introduces a time delay of one complete field-trace interval for reasons which will become apparent later, to one input circuit of an audio coder 496. This coder may be similar in construction to each of coders 71–86 in FIGURE 2 and also responds conjointly to an audio signal and a phase modulated square wave control signal to produce a coded audio signal having a series of phase inversions determined by the amplitude excursions of the control signal. The output terminals of coder 496 are connected to an audio carrier wave generator and modulator 497, and the modulated-carrier audio signal is supplied therefrom to another input circuit of diplexer 491.

Figure 2:
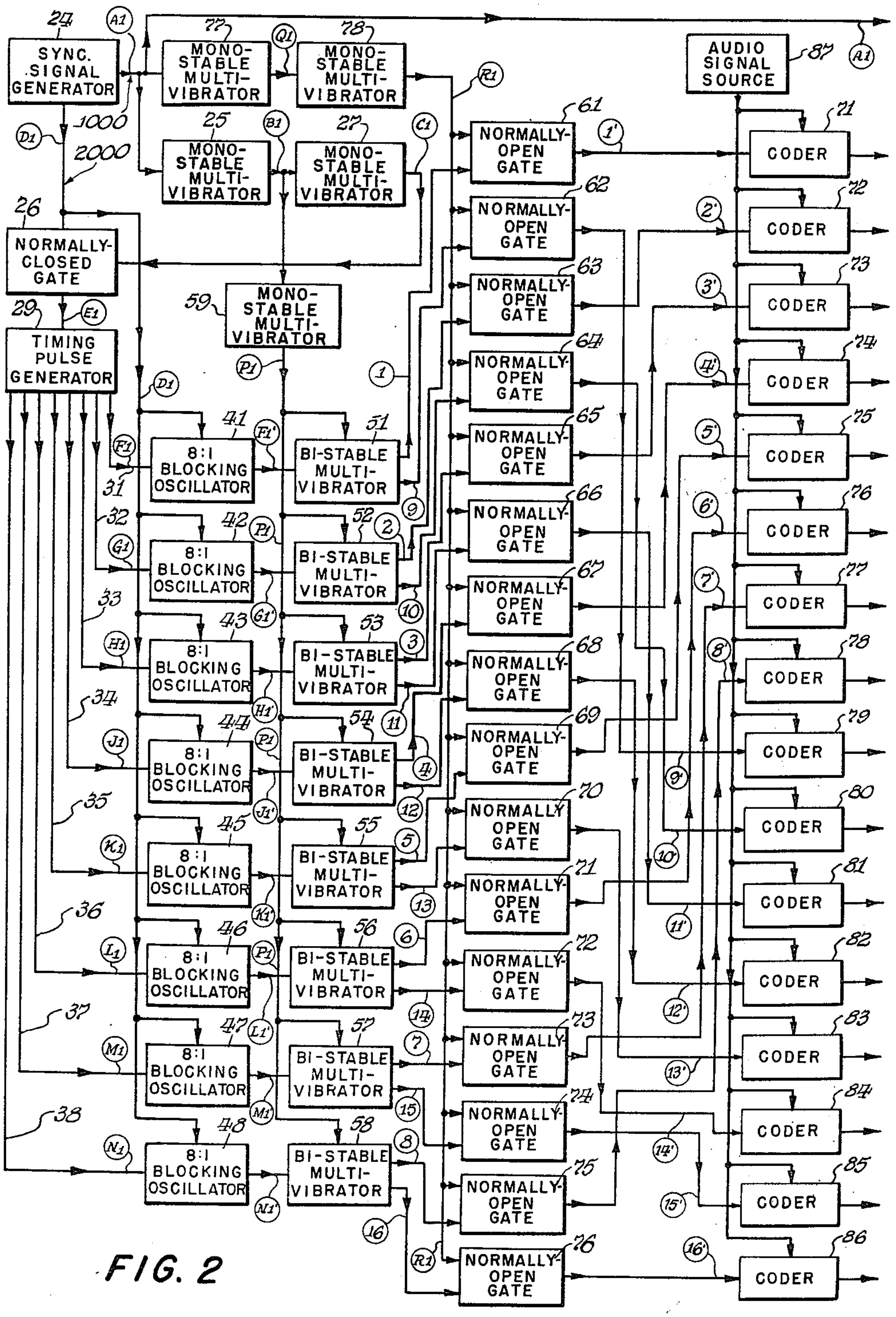
FIGURES 2–6 are schematic diagrams collectively illustrating an entire subscription television transmitter including a code signal generator constructed in accordance with the invention.

Output circuit 2000 of synchronizing-signal generator 24 is also connected to the counting or common input of an 8:1 blocking oscillator 498 which, in turn, is connected to the counting or common input of a conventional bi-stable multivibrator 500. This multivibrator is preferably identical in construction to multivibrator 280 in FIGUE 5 in that it comprises two cross-coupled triodes which are rendered conductive in alternation as the multivibrator is triggered between its two operating conditions. There are three input circuits designated $R_1$, C and $R_2$, pulses applied over input $R_1$ triggering the multivibrator to a predetermined one of its operating conditions, if it is not already there, pulses applied over $R_2$ actuating the multivibrator to the other of its two operating conditions, if it is not already there, and pulses applied over input C tripping the multivibrator from its instantaneous condition, whatever one that may be, to its opposite condition. The anode of one of the triodes in multivibrator 500 is connected to one input circuit of a normally-open gate circuit 501 which has another input circuit connected to multivibrator 78 (FIGURE 2). The output terminals of gate 501 are connected to the deflection elements of video coder 487 to supply a deflection-control signal thereto in order to effect actuation of coder 487 between its two operating conditions and code the video components of the television signal in accordance with the code schedule represented by the amplitude changes or excursions of the control signal. The output of gate 501 is also connected to a separate input circuit of audio coder 496 to effect actuation thereof and to phase invert the audio signal in response to each amplitude excursion of the control signal.

The common output circuit from all of generators 331–336 and 451 (FIGURE 5) is connected to a separate input circuit of mixer amplifier 488 in order to add the signal bursts developed by the generators to the composite video signal for concurrent radiation therewith. Generators 331–336 and 451 are also connected to the input circuit of a device 503 which contains a series of six filter and rectifier units each tuned to an assigned one of the six frequencies, $f_1$–$f_6$, in order to segregate the signal bursts one from the other. Device 503 has six output circuits on which the segregated rectified signal bursts $f_1$–$f_6$ appear and are connected to respective ones of a series of six normally-closed gate circuits 504–509. These gates also have separate input circuits connected to output circuit 2000 of sync generator 24 to receive line-drive pulses and have their output circuits connected to the input terminals of a switching mechanism 510. Mechanism 510 has four output circuits 511–514, output 511 being connected to the reset input of blocking oscillator 498, output 512 being connected to the $R_1$ input of multivibrator 500, output 513 being connected to the C input of the multivibrator, and output 514 being connected to the $R_2$ input of multivibrator 500.

Switching mechanism 510 is provided to establish any selected one of a multiplicity of possible interconnection patterns between gates 504–509 and output circuits 511–514. For the airborne coding information to be itself coded, it must distinguish from the code information applied to blocking oscillator 498 and multivibrator 500. A new adjustment of the switching mechanism is preferably made before each program interval and this information is conveyed only to authorized subscribers. Suitable switching mechanisms that provide adequate degrees of security against unauthorized deciphering are disclosed and claimed in, for example, copending applications Serial No. 407,192, filed February 1, 1954, and issued December 30, 1958, as Patent 2,866,961, in the name of George V. Morris; Serial No. 419,301, filed March 29, 1954, and issued August 19, 1958, as Patent 2,847,768 in the name of Jack E. Bridges; Serial No. 490,078, filed February 23, 1955, and issued April 18, 1961, as Patent 2,980,901, in the name of George V. Morris et al.; and Serial No. 555,541, filed December 27, 1955, and issued September 8, 1959, as Patent 2,903,686, in the name of Jack E. Bridges, all of which are assigned to the present assignee.

Figure 9:
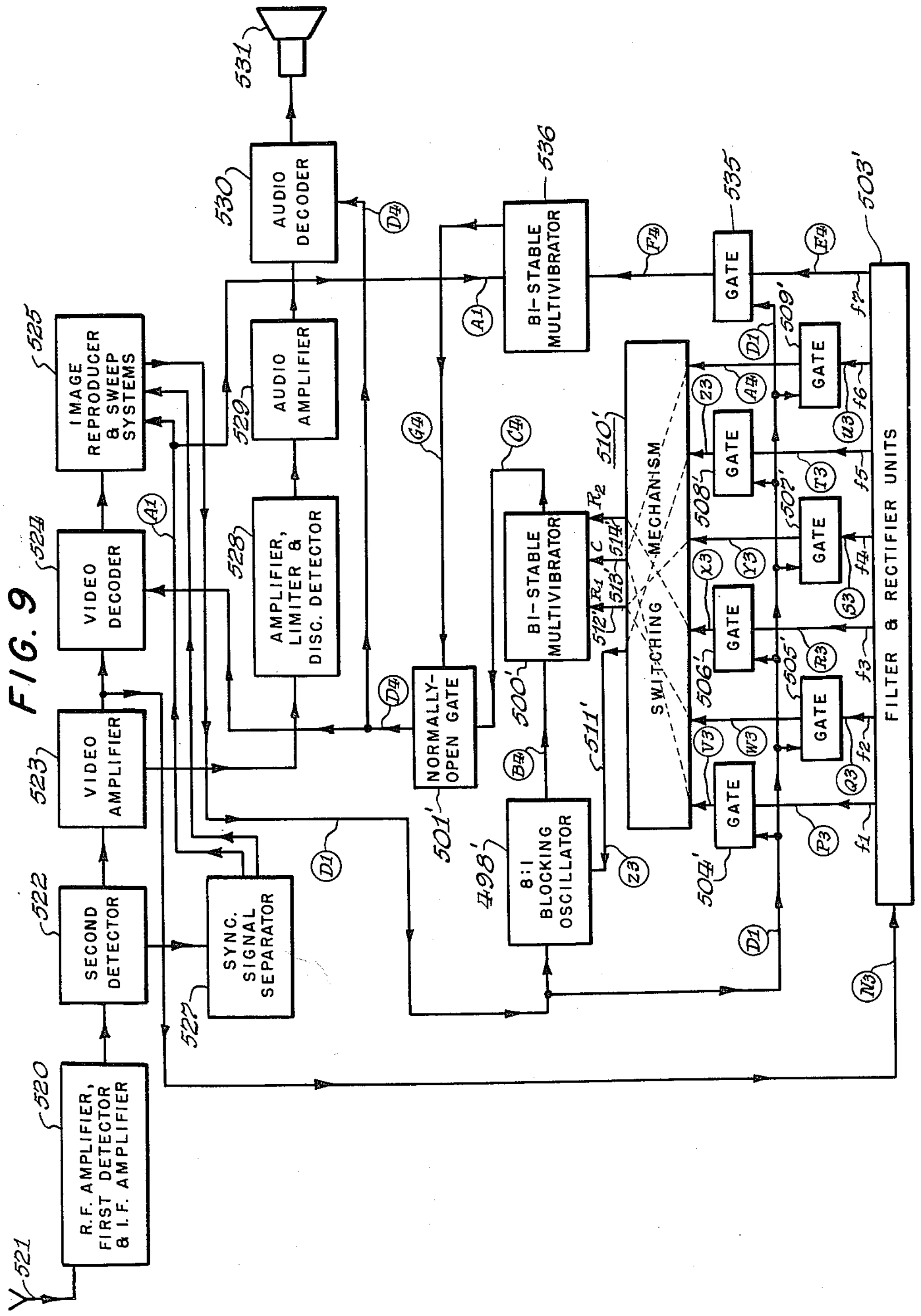
FIGURE 9 is a schematic representation of a subscription television receiver adapted to utilize the coded signal developed in the transmitter of FIGURES 2–6.
Figure 10:
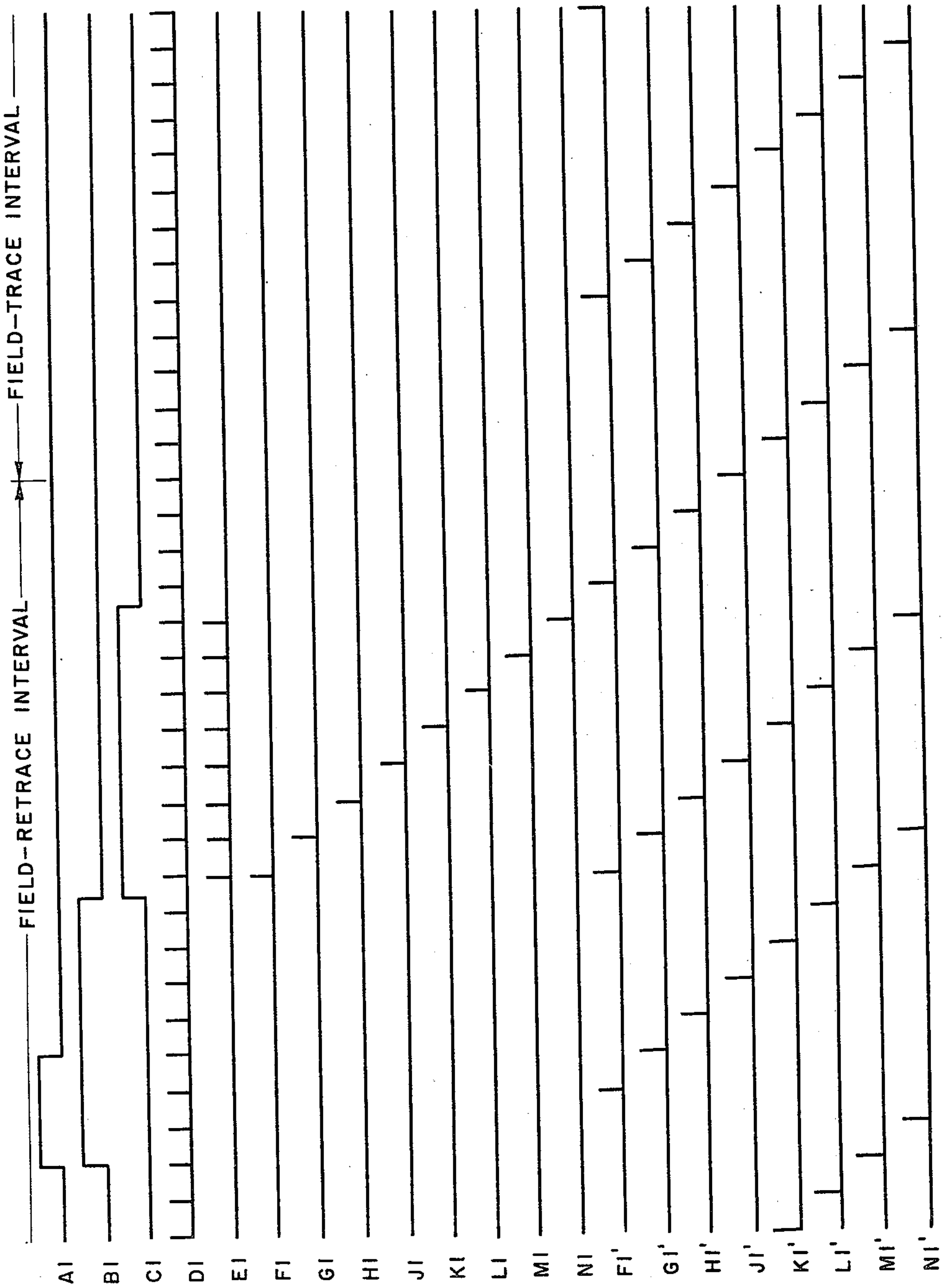
FIGURES 10–15 are idealized graphical representations of various wave forms helpful in explaining the operation of the transmitter and receiver of FIGURES 2–9; and, FIGURES 16 is a layout diagram showing the manner in which FIGURES 10–15 should be laid out to maintain the proper phase relationship between the various curves.
Figure 11:
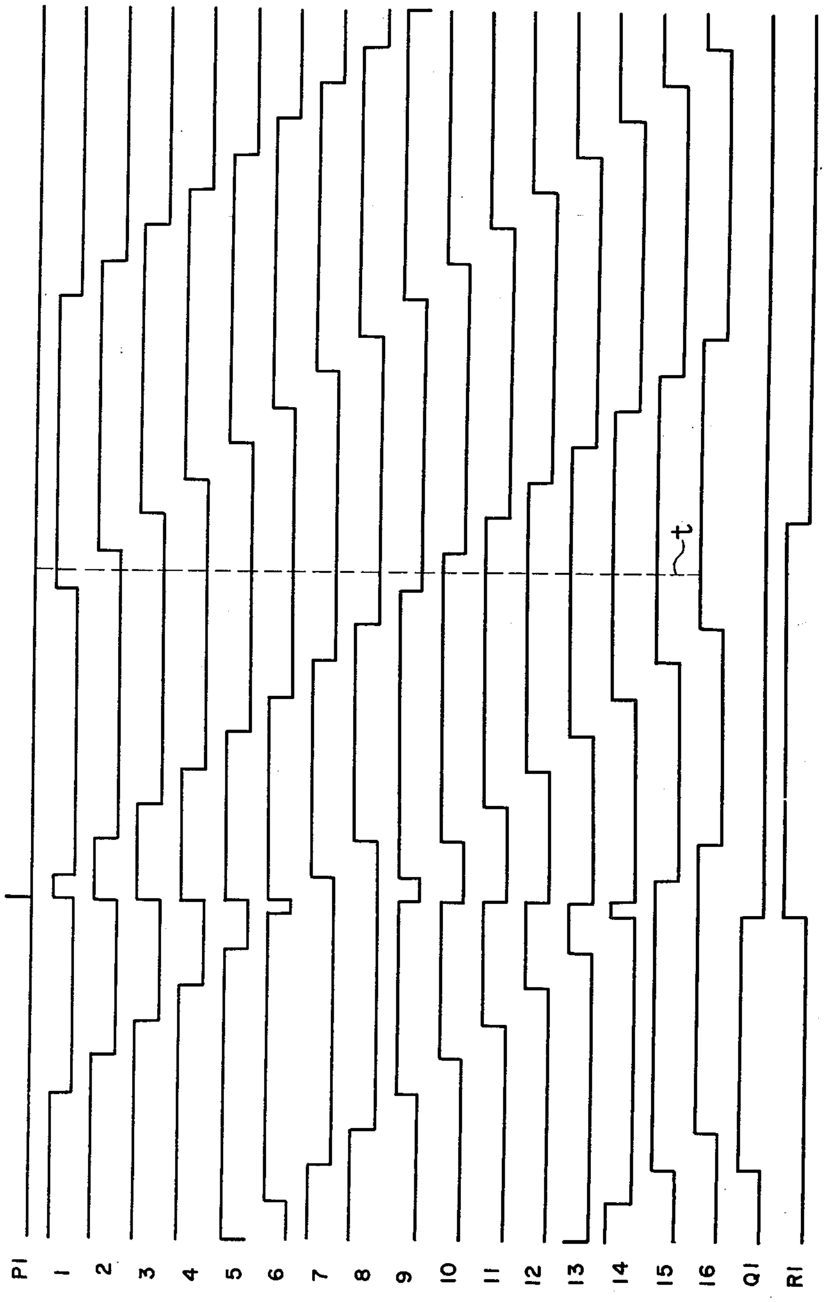
Figure 12:
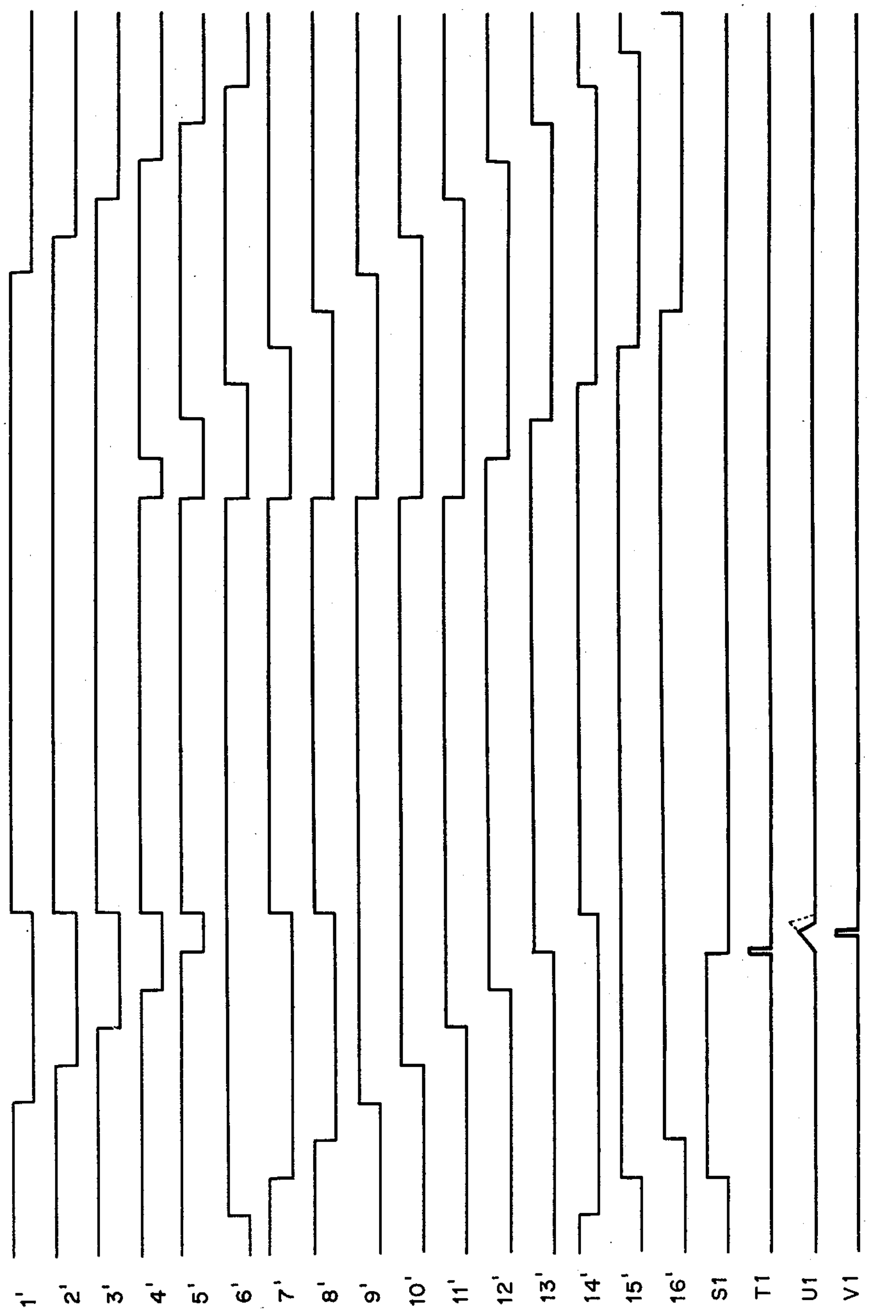
Figure 13:
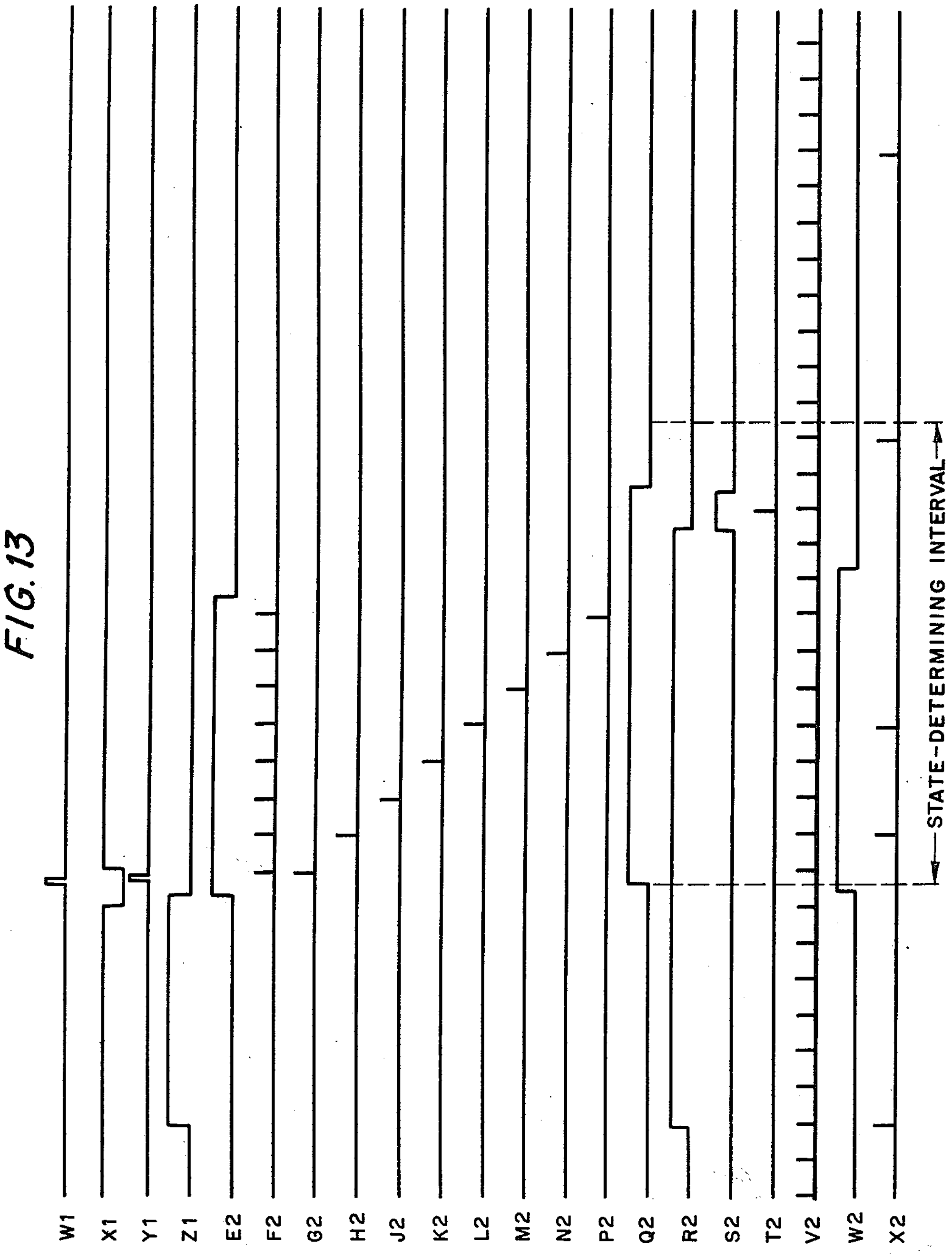
Figure 14:
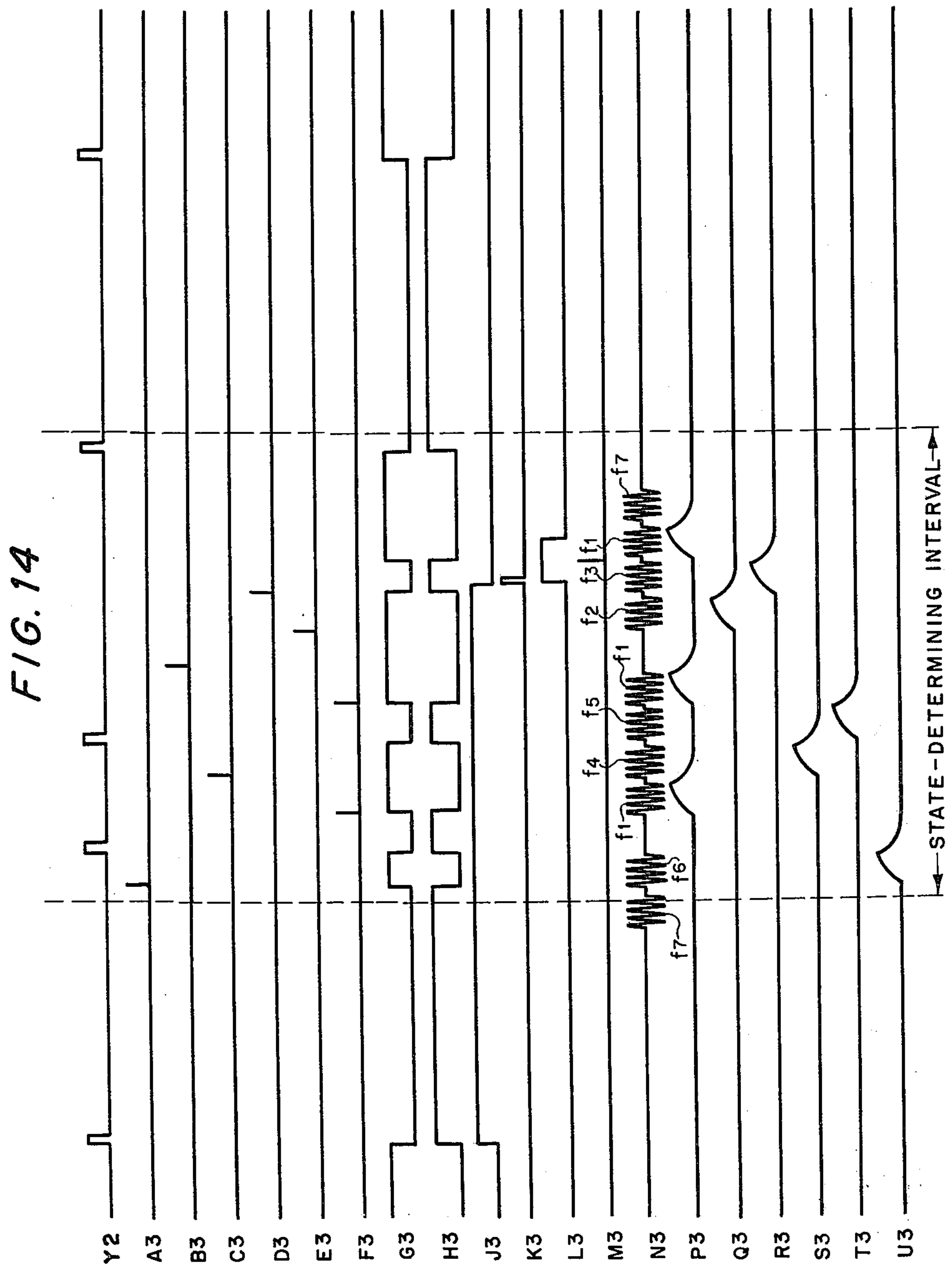
Figure 15:
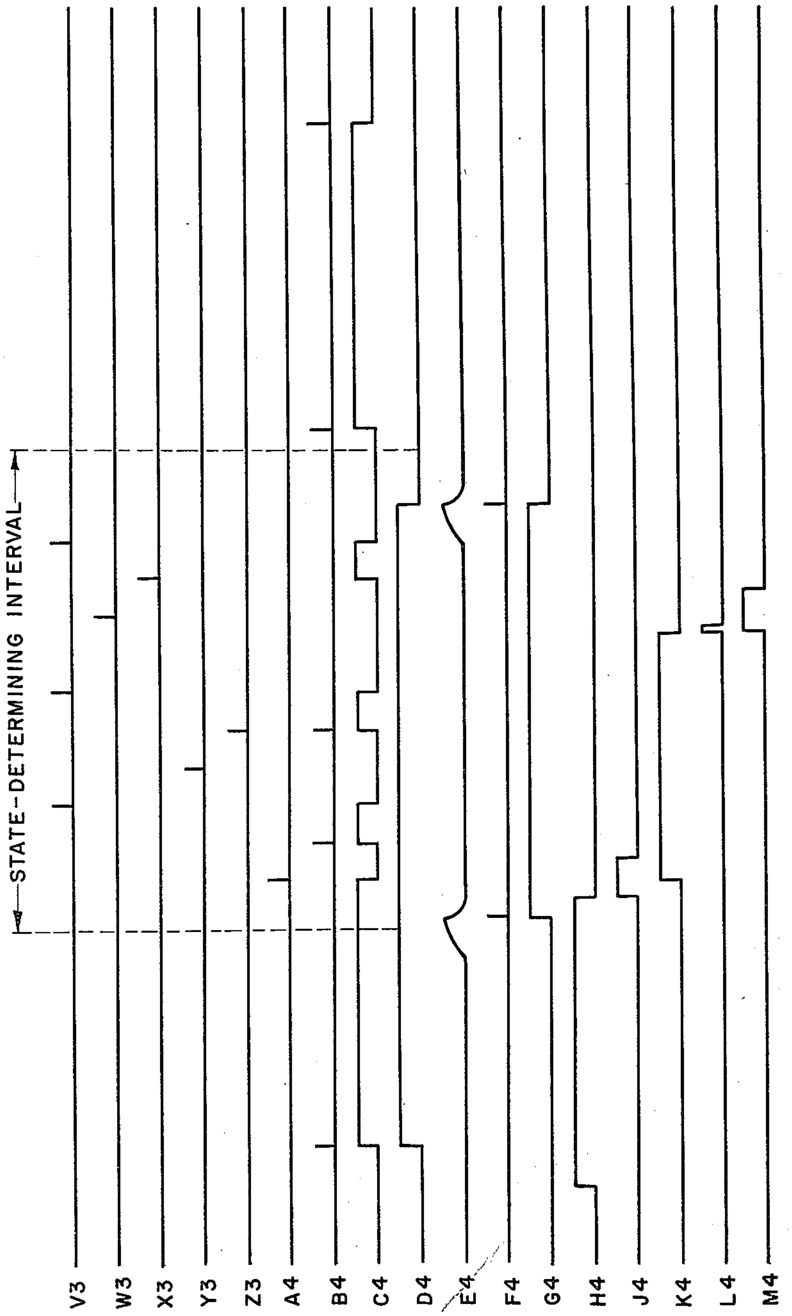

The receiver of FIGURE 9 is constructed to decode especially the coded television signal produced in the transmitter of FIGURES 2–6. It comprises a radio-frequency amplifier, a first detector and an intermediate-frequency amplifier connected in cascade and all represented by one block 520. The input terminals of the radio-frequency amplifier are connected to an antenna 521 and the output terminals of the intermediate-frequency amplifier are connected to a second detector 522 which in turn is connected to the input terminals of a video amplifier 523. Amplifier 525 is connected to a video decoder 524 which develops a decoded video signal for application to the input electrodes of a cathode-ray image reproducing device which is included in a unit represented by block 525. Video decoder 524 may be similar to video coder 487 (FIGURE 6) at the transmitter except that it is controlled to operate in a complementary fashion in order to effectively compensate for variations in the relative timing of the video and synchronizing components of the received television signal.

Second detector 522 is also coupled to a synchronizing-signal separator 527 which has output circuits connected to a field-sweep system and to a line-sweep system included in unit 525. The sweep systems are connected respectively to the field- and line-deflection elements (not shown) associated with the image reproducer in unit 525.

Video amplifier 523 has another output circuit connected to the input terminals of a cascade arrangement of an amplifier, limiter and discriminator detector, all represented by a single block 528. The output signal from the detector is translated through an audio amplifier 529 to the input terminals of an audio decoder 530 that may be identical in construction to coder 496 (FIGURE 6) in the transmitter so that when actuated by a corresponding control signal, it effects compensating phase inversions of the coded audio in time coincidence with phase inversions at the transmitter in order to effectively decode the audio signal. The output circuit of decoder 530 is connected to the input terminals of a speaker 531.

Video amplifier 523 is also connected to a series of filter and rectifier units represented by a single block 503' which is similar to element 503 in the transmitter with the one exception that it has an additional filter and rectifier for segregating the signal bursts of $f_7$ frequency. Most of the remaining elements in FIGURE 9, designated with primed reference numerals, correspond to elements with similarly numbered but unprimed numerals in FIGURE 6. The only difference in FIGURE 9 is that the 8:1 blocking oscillator 498' operates in response to line-drive pulses from the line-sweep system in unit 525 whereas blocking oscillator 498 operates in response to line-drive pulses from sync generator 24. The output of normally-open gate circuit 501' is connected to both video decoder 524 and audio decoder 530 to effect complementary operation with respect to that of the counterpart coders in the transmitter. The $f_7$ bursts are separated in block 503' and are applied through a gate circuit 535, which is also connected to the line-sweep system to derive line-drive pulses therefrom, to the input terminals of a bi-stable multivibrator 536. This multivibrator is connected to separator 527 to receive field-drive pulses in order that it may be actuated or reset to a reference condition during each field-retrace interval. The output terminals of multivibrator 536 are connected to another pair of input terminals of normally-open gate circuit 501'.

Figure 16:
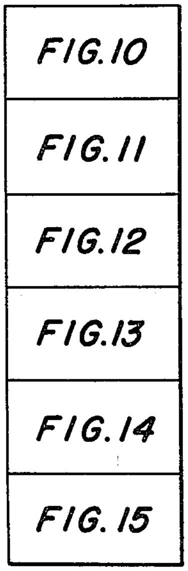

Consideration will now be given to an explanation of the operation of the invention with particular reference to the various idealized signal wave forms of FIGURES 10–15 appearing at certain points in the transmitter and receiver as indicated by the encircled combinations of reference letters and numbers, or to encircled numbers alone, which are correspondingly identified by the same letter and number designations or number designations alone in FIGURES 10–15. It will be remembered that in order to maintain the proper phase relationship between the several curves in the different figures, FIGURES 10–15 should be physically arranged as shown in FIGURE 16.

The one pulse in curve A1 represents a typical field- or vertical-drive pulse which is developed in generator 24. Mono-stable multivibrator 25 (FIGURE 2) is actuated in response to the leading edge of the field-drive pulse of curve A1 and assumes its opposite condition from which it returns to its stable condition after a predetermined duration of time to produce the elongated pulse of curve B1. Multivibrator 25 is so constructed that the duration of its output pulse of curve B1 is such that the trailing edge thereof occurs between the second and third line-drive pulses immediately succeeding the second series of equalizing pulses (not shown) during the field-retrace interval associated with the field-drive pulse of curve A1. Mono-stable multivibrator 27 is triggered in response to the trailing edge of the pulse of curve B1 to produce the pulse of curve C1 which has a duration embracing or overlapping in point of time eight complete line-trace intervals. The pulse of curve C1 serves as a gating pulse for normally-closed gate circuit 26 which is continuously supplied with the line-drive pulses from generator 24 shown in curve D1 to produce the eight line-drive pulses of curve E1 in the output of gate 26.

Timing pulse generator 29, which as mentioned previously comprises a ring counter, operates in response to these eight line-drive pulses of curve E1 and effectively separates them one from the other to develop at each one of its eight output circuits 31–38 a single selected one of the pulses of curve E1 as represented by wave forms F1–N1, respectively. More specifically, the ring counter in generator 29 is advanced from one of its eight stable operating conditions to the next in response to the successively applied pulses of curve E1 and since output circuits 31–38 are individually connected to assigned ones of the eight operating stages, a pulse is developed at each output circuit as the assigned stage is triggered in the sequence.

Meanwhile, 8:1 blocking oscillators 41–48 are operated in cyclic fashion in response to the line-drive pulses of curve D1, each oscillator producing an output pulse in response to each series of eight line-drive input pulses. The pulses of curves F1–N1 are also applied to blocking oscillators 41–48, respectively, to reset those oscillators so that the output signals illustrated in curves F1'–N1' are developed in the outputs of oscillators 41–48, respectively. It will be noted that subsequent to the occurrence of the reset pulses of curves F1–N1 the time intervals between successive pulses in each of curves F1'–N1' equals eight full line-trace intervals because of the count-down ratio of the oscillators. There are only six complete line traces between the pulses of curves F1'–N1' resulting from the reset operation (which coincide with the pulses of curves F1–N1) and the immediately preceding family of pulses appearing at the outputs of the 8:1 blocking oscillators, since with present transmitting standards in the United States, the number of line- trace intervals in a field (262½) is non-integrally related to the 8:1 count-down ratio of blocking oscillators 41–48; therefore, at the beginning of each field-trace interval, the reset pulses of curves F1–N1 arrive when the oscillators have completed only six of their usual eight operating steps.

The output signals of curves F1'–N1' from oscillators 41–48, respectively, are applied to bi-stable multivibrators 51–58, respectively, to effect operation thereof. Meanwhile, mono-stable multivibrator 59 operates in response to the trailing edge of the pulse of curve B1 to produce the sharply defined narrow pulse of curve P1 which is applied to each one of multivibrators 51–58 for resetting purposes. The pulse of curve P1 establishes each of the multivibrators in a predetermined one of its two operating conditions, if it is not already there. Consequently, in response to the conjoint effect of the pulses of curves F1'–N1' and P1, multivibrators 51–56 respectively produce the signals of curves 1–6. Since the output connections from multivibrators 57 and 58 are transposed as compared with those of the other multivibrators 51–56, their output signals are oppositely phased and the signals appearing at the upper output leads from multivibrators 57 and 58 are of the form shown in curves 7 and 8. Output signals 9–16 of corresponding shape and opposed phase relative to signals 1–8 are developed in the other output circuits of multivibrators 51–58, respectively. The significance of the dashed construction line running through curves 1–16 and designated *t* will be explained hereinafter.

Meanwhile, mono-stable multivibrator 77 operates in response to the field-drive pulse of curve A1 to produce the pulse of curve Q1. The parameters of multivibrator 77 are so chosen that the trailing edge of the pulse of curve Q1 occurs in time coincidence with the leading edge of the line-drive pulse immediately preceding the first line-drive pulse of curve E1, for reasons which will be explained hereinafter. Mono-stable multivibrator 78 is tripped to its abnormal condition responsive to the trailing edge of the pulse of curve Q1 to produce the elongated pulse of curve R1 which has a duration overlapping in point of time eleven complete line-trace intervals.

The signals of wave forms 1, 9, 2, 10, 3, 11, 4, 12, 5, 13, 6, 14, 7, 15, 8 and 16 are applied to normally-open gate circuits 61–76, respectively, which are rendered inoperative or closed by the pulse of curve R1, and thus the signals of wave forms 1', 9', 10', 3', 11', 4', 12', 5', 13', 6', 14', 7', 15', 8' and 16' are developed at the outputs of gates 61–76, respectively, for application to coders 71, 79, 72, 80, 73, 81, 74, 82, 75, 83, 76, 84, 77, 85, 78, 86, respectively.

The system thus far described has developed a series of sixteen control signals (1'–16') each of which has amplitude excursions occurring every eight line-trace intervals during the field-trace interval but each with a different phase relationship of the amplitude excursions with respect to the composite television signal. Since each one of oscillators 41–48 produces a pulse every eight line-trace intervals and since multivibrators 51–58 are triggered back and forth in response to the pulses from the blocking oscillators, there are actually sixteen different phase conditions represented by the sixteen control signals 1'–16'. The utility of deleting the amplitude excursions of curves 1–16 during the time interval represented by the pulse of curve R1 will be made apparent later.

It will be remembered that the reason undesirable ping distortion is introduced is attributable to phase inverting the audio signal at times when the audio signal is close to or at a zero cross-over point. It will be appreciated that in a system where the square wave shaped control signal utilized for timing the phase inversions may have one of sixteen different phase conditions, it would be most advantageous to actually select the phase condition which would give rise to a coded audio signal with the least D.C. component or ping distortion, or with a D.C. component lying within a range of values all of which result in negligible ping. In other words, phase inverting the audio at instants determined by different selected ones of the signals of curves 1′–16′ from time to time may result in a reduction in ping distortion relative to that obtained by the use of any individual one of the coding signals continuously because in this manner the phase inversions may be made to occur primarily at instants when the audio signal is at either a positive or negative peak amplitude. The disclosed apparatus is particularly adapted to select an optimum switching schedule between the coding signals 1′–16′ to achieve minimum ping.

Inasmuch as it is possible in the illustrated embodiment to use any one of sixteen different control signals for coding purposes, it may be said that the system has sixteen possible operating states or phase conditions corresponding to curves 1′–16′. During each field-retrace interval a determination is made as to the particular one of the sixteen possible operating states that gives rise to the minimum ping distortion and steps are then taken to place the transmitter and various receivers in that operating state for the succeeding field-trace interval. The manner in which one of the control signals of curves 1′–16′ is selected to produce a coded audio signal of least ping distortion will now be explained.

The sound intelligence accompanying a television program is picked up and amplified in audio signal source 87 and is concurrently applied to each one of coders 71–86. Meanwhile, each one of those coders is supplied with a different one of control signals 1′–16′. Since each one of the control signals represents an assigned one of the sixteen operating states of the system, the phase inversions of the audio signal take place at different instants in each one of the coders resulting in the production of several, specifically sixteen, differently coded intelligence or audio signals at the outputs of coders 71–86. Each one of the coded intelligence signals is coded in accordance with a respective one of the operating states, namely in accordance with the amplitude excursions of an assigned one of curves 1′–16′. Moreover, inasmuch as the phase inversions occur at different times in each of coders 71–86 and therefore at different points in the audio signal cycles, each one of the coded audio signals contains a corresponding characteristic or signal component, such as its D.C. component, which has a different or unique predetermined magnitude-polarity condition. Of course, since each one of curves 1′–16′ has a 180° counterpart, for example 9′ is the counterpart of 1′, 2′ is the counterpart of 10′, etc., at times two of coders 71–86 may produce coded audio signals having the same magnitude or amplitude of D.C. component but they will be of opposite polarity.

The several differently coded audio signals from coders 71–86 are applied to input terminals of control circuits 91–106, respectively. As will now be shown, the control circuits determine which of the several coded audio signals contains the D.C. component having a magnitude closest to a predetermined reference magnitude but of opposite polarity with respect thereto to result in minimum ping distortion. It should be pointed out that during any given field-trace interval the coded audio signal exhibiting the D.C. component of least amplitude does not necessarily represent the most desirable operating state in which all of the receivers should be placed. This follows because the coded audio, coded in accordance with a previous determination, may have exhibited a certain D.C. component, be it ever so small, which may have charged up the coupling networks at the receivers, providing a residual or "past history" charge. The next determination should then take this previous D.C. component into account and the coded audio selected should be that which contains a D.C. component which, when additively combined with the stored residual D.C. component, yields a minimum resultant D.C. component.

A computation is made on the basis of the level and polarity of the D.C. component included in each of the coded audio signals after they have been coded in accordance with the sixteen respective operating states for one entire field-trace interval. For this reason, before the audio signal from source 87 is applied to audio coder 496 for coding in accordance with the selected program of operating states and transmitted to the receivers, it is delayed for one entire field-trace interval, as will be discussed hereinafter.

In order to understand the manner in which the coded audio signal exhibiting the desired D.C. component is actually determined by control circuits 91–106, attention is directed to FIGURE 8 which shows the details of a typical control circuit 95. For purposes of illustration it will be assumed initially that no previous charge has been built up in the receivers (namely, no history) and that during the entire field-trace interval preceding the field-drive pulse of curve A1 the audio signal has such frequency and amplitude characteristics that the coded audio signal developed in coder 75 contains a smaller D.C. component than that developed by any of the other coders 71–74, 76–86. Consequently, it would be desirable to code that time segment of the audio signal in accordance with operating state 5 which corresponds to the schedule of the control signal 5′ applied to coder 75.

Turning now to FIGURE 8, and disregarding for the moment elements 133–139, 245, and 247 (since such elements are only useful when history or previous charge is present), condenser 218 develops a charge or control potential which corresponds or is proportional to the D.C. component of the coded audio signal from coder 75 integrated throughout the entire field-trace interval preceding the field-drive pulse of curve A1. The control potential across condenser 218 is amplified without change of polarity in D.C. amplifier 219 and is applied to cathode 224 of diode 225, cathode 229 of diode 230, and also to cathode 234 of diode 235. If this integrated D.C. component of the coded audio is of positive polarity, none of diodes 225, 230 or 235 will conduct.

Meanwhile, mono-stable multivibrator 127 (digressing briefly to FIGURE 3) triggers in response to the leading edge of the field-drive pulse of curve A1 to produce the pulse of curve S1, the parameters of the multivibrator being so selected that the trailing edge of the pulse occurs one full line trace before the commencement of the pulse of curve R1. Mono-stable multivibrator 128 in turn responds to the trailing edge of the pulse of curve S1 to produce the sharply defined, narrow pulse of curve T1 which is applied to triangular wave shape generator 129 to initiate the operation thereof. This generator when energized produces a saw-tooth shaped triangularly shaped pulse, such as that shown in solid line construction in curve U1, having a duration determined by the magnitude of the control potential from coder 75, for application to anode 236 of diode 235 and to all of the corresponding diodes in the other control circuits 91–94, 96–106. Since the control potential impressed on cathode 234 is positive, diode 235 remains cut off until the instantaneous potential of the pulse of curve U1 exceeds the control potential, at which time diode 235 becomes conductive; this gives rise to a potential drop which is differentiated by elements 240, 241 and, after amplification and phase inversion in amplifier 242, is applied as a triggering signal to blocking oscillator 115. It may be assumed for illustrative purposes that the D.C. level of the coded audio from coder 75 is such that the control potential is not exceeded by the instantaneous amplitude of the pulse of wave form U1 until the time represented by the occurrence of the pulse of curve V1 which is that developed in blocking oscillator 115.

Simultaneously, the pulse of curve V1 is applied to triangular wave shape generator 129 by way of diode 145 to render the generator inoperative and to return the instantaneous amplitude of the triangular wave form of curve U1 back to its reference level. The dashed line extension of the pulse of curve U1 illustrates its maximum duration. Within the line-trace interval during which generator 129 operates, one of the sixteen control potentials will turn the generator off. With this arrangement, as soon as a pulse is developed by blocking oscillator 115, which indicates that the coded audio from coder 75 contains the smallest D.C. component of any of the sixteen coded audio signals, generator 129 is cut off so that all of the remaining control circuits 91–94 and 96–106 are rendered inoperative; thus pulses corresponding to V1 are not developed by any of the other blocking oscillators 111–114 and 116–126.

If the D.C. component of the coded audio from coder 75 is still less than that developed in all of the other coders but is of negative rather than positive polarity, the control potential developed by D.C. amplifier 219 is also negative, and diode 230 is rendered conductive. This precludes the application of the control potential to cathode 234 of diode 235, since diode 230 provides a substantial short circuit to ground in this condition. Diode 225 also conducts because of the negative D.C. potential on its cathode 224 and thus the control potential is developed across resistor 227 for application through buffer 238 to anode 236 of diode 235, also with negative potential. Diode 235 still does not conduct because of the negative potential on its anode 236 but when the instantaneous amplitude of the triangular wave shape of pulse U1 exceeds the negative potential from D.C. amplifier 238, diode 235 conducts and provides a triggering signal for blocking oscillator 215 in the same manner as described hereinbefore in connection with a coded audio signal having a positive D.C. component.

Thus, the coder developing the smallest D.C. component is indicated because the triggering diode 235 of its associated control circuit is rendered conductive in advance of the corresponding diodes in the other control circuits. As soon as the control circuits 91–106 indicate which coded audio signal has the smallest D.C. component, a pulse similar to that of curve V1 is developed by the associated one of blocking oscillators 111–126 to shut off all of the other control circuits.

It has thus been demonstrated that the control circuits 91–106 effectively determine which of the several coded audio signals contain the smallest D.C. component and thus only one of blocking oscillators 111–126 is triggered; in the assumed case blocking oscillator 115 is actuated and develops the pulse of curve V1. This pulse is applied to binary 165 to effect actuation thereof from its instantaneous operating condition (the operating condition in which it is found immediately prior to the arrival of the triggering pulse V1) to its opposite condition. As mentioned previously, all of binaries 161–176 are interconnected to form an open ring; thus only one binary is actuated from its instantaneous condition to its opposite condition. It will be appreciated that at times two or more of the coded audio signals from coders 71–86 may contain D.C. components of substantially the same magnitude within a range of values or magnitudes any one of which results in negligible ping, and thus occasionally pulses will be developed simultaneously by two or more of blocking oscillators 111–126. However, only one of binaries 161–176 will be tripped because of the characteristics of an open ring, and thus only one operating state will be selected. If pulses are supplied to two or more of the binaries simultaneously it does not make any difference which binary is triggered as in that event any one of the two or more selected operating states will provide the least ping distortion.

Consequently, under the assumed conditions that only blocking oscillator 115 produces an output pulse (curve V1) only binary 165 is actuated to its other operating condition in response to that pulse and only normally-closed gate circuit 185 is placed in its open condition, the other gates 181–184 and 186–196 remaining in their normally closed condition. Meanwhile, the pulse of curve T1 from mono-stable multivibrator 128 is delayed in delay line 130 for approximately 75% of a line-trace interval to provide the pulse of curve W1 for concurrent application to the input circuits of gates 181–196. Since only gate 185 is open for the illustrated case, the pulse of curve W1 only appears at the output of that gate. The pulse of curve W1 may be considered a control effect which represents or identifies the selected coded intelligence signal from coder 75.

Returning now to FIGURE 8, it will be shown that control circuit 95, as well as the other control circuits, quite often, and in fact usually, do not select the coded audio signal having the D.C. component of lowest absolute magnitude but rather selects the coded signal having a D.C. component closest to a predetermined reference magnitude but of opposite polarity with respect to it. It will be appreciated, as mentioned before, that while the coded audio is coded in accordance with the operating state which will result in least ping distortion, there may be a D.C. component of some magnitude and of either positive or negative polarity, even though the objective is to have no D.C. whatsoever. If that D.C. component is successfully transmitted to all of the receivers, the various coupling networks in the receiver will charge up to the potential of that D.C. component. Since the condensers in the coupling networks are not immediately discharged in the receivers after each field-trace interval, a residual charge remains. Consequently, it is desirable in making the determination by the control circuits to take into account the "past history" of the system, namely the charge which the receiver coupling networks assume in response to the previous determination.

To this end, and assuming that control circuit 95 has also selected the coded audio signal from coder 75 during the field-retrace interval one full field trace preceding that shown in the curves, a pulse similar to that shown in curve W1 (only occurring one field-trace interval previously) is applied to sampler 245 to sample the D.C. control potential developed across condenser 218, as amplified by D.C. amplifier 219, one field trace before. This information is transferred by sampler 245 to storage condenser 133 wherein it remains during the entire field-trace interval preceding the field-drive pulse of curve A1. The potential developed across condenser 133 is translated through buffer amplifier 134 and normally-open gate circuit 135 to storage condenser 138 in which it also remains for the entire field-trace interval preceding the vertical-drive pulse of curve A1. Of course, if some other control circuit other than circuit 95 determined or selected the coded audio with the smallest D.C. component, a corresponding sampler 245 in that particular control circuit would provide the charging potentials for condensers 133 and 138. It will be remembered that condensers 133 and 138 are common to all of control circuits 91–106.

Assuming that condenser 138 has stored a charge for the complete field-trace interval before the occurrence of the pulse of curve A1, the stored potential is applied through buffer stage 137 to cathode 224 of diode 225. In this way, the potential across condenser 138 is applied to each one of control circuits 91–106 to represent a reference magnitude of a predetermined polarity. To further explain, assume that the control potential applied to each of the control circuits through D.C. buffer amplifier 137 is positive one volt. Assume further that the D.C. control potentials developed at the outputs of the corresponding D.C. amplifiers 219 in the various control circuits 91–106 differ from each other in steps of one volt from a negative eight volts to a positive eight volts.

Since the control circuits are already biased with a positive one volt because of "past history," the control circuit developing a negative one volt control potential at the output of its amplifier 219 is the control circuit which will be the first one to provide an output pulse. Thus, an operating state will be selected which will provide a D.C. component of a negative one volt rather than zero so that when the audio, coded in accordance with that operating state, is combined with the charge already present in the receivers, the charge on the receiver coupling networks will be reduced to zero. In short, the control circuits effectively compare the reference potential (+1 volt) with each of the control potentials and determine which control potential has a magnitude closest to the reference magnitude of 1 volt but has a polarity opposite to that of the reference potential.

It is desirable to isolate storage condenser 138 from condenser 133 and buffer amplifier 134 during the line-trace interval in which the control circuits select the proper coded audio signal; to that end, normally-open sampler 135 is closed in response to, and throughout the duration of, the pulse of curve X1 which is developed from the pulse of curve T1 by means of mono-stable multivibrator 136. With such an arrangement, the charge on condenser 138 is acquired one complete field trace before it is used, namely condenser 138 is charged to the potential stored in condenser 133 immediately subsequent to the termination of the X1 pulse occurring during the field-retrace interval occurring one full field trace before a selection is made. If condenser 138 is not divorced from condenser 133 and buffer amplifier 134, when sampler 245 is operated in response to the pulse of curve W1 to supply a potential to condenser 133, there will be a closed loop which will result in regeneration.

With the illustrated arrangement, the control potential representing the magnitude and polarity of the D.C. component of the selected coded audio signal is sampled and stored by condensers 133 and 138 to establish the proper reference level for use one field-trace interval later in making the ensuing coded audio signal selection for minimum ping distortion.

Inasmuch as a determination is made once each field-retrace interval based on the D.C. levels of the sixteen differently coded audio signals for the preceding field-trace interval, it is desirable to discharge all of the corresponding condensers 218 immediately subsequent to each determination so that the condensers will have no residual charge and may charge up to the D.C. levels of the applied coded audio signals during the succeeding field-trace interval preparatory to the next determination one complete field trace later. Discharge switches corresponding to switch 220 accomplish this function and they are operated in response to the pulse of curve Y1 which is produced in mono-stable multivibrator 131 responsive to the trailing edge of the pulse of curve W1.

Thus far, it has been shown by way of illustration that the audio signal occurring during the field-trace interval preceding the field-drive pulse of curve A1 would, if coded by means of a control signal like that shown in curve 5′, contain the smallest D.C. component and thus give rise to the least ping distortion. It is now necessary to develop an encoding signal which has a code pattern representing a transition from whatever operating state may have been utilized during the preceding field-trace interval to operating state five, the operating state represented by the control signal of curve 5′. In the ensuing discussion, it will be borne in mind that for increased security it is extremely beneficial to select the code pattern from a relatively large group of different code patterns all of which represent a transition to the same selected operating state.

Mono-stable multivibrator 261 (FIGURE 4) responds to the field-drive pulse of curve A1 to produce the pulse of curve Z1. The multivibrator is so constructed that it returns to its normal operating condition during the line-trace interval in which the computation or determination by the control circuits occurs. Mono-stable multivibrator 262 responds to the trailing edge of the pulse of curve Z1 to develop the pulse of curve E2 for application to normally-closed gate circuit 263. The parameters of multivibrator 262 are so selected that the pulse of curve E2 embraces or overlaps in point of time eight line-drive pulses of curve D1. Gate 263 is also supplied with the line-drive pulses of curve D1 so that the eight pulses of curve F2 are developed at its output. Timing pulse generator 265 responds to these eight pulses in a manner similar to that of timing pulse generator 29 (FIGURE 2) to produce the pulses of curves G2–P2 on the output circuits 271–278, respectively.

In the meantime, mono-stable multivibrator 205 responds to the control effect provided by control circuit 95, namely the pulse of curve W1, to produce the signal of curve Q2, the circuit components of multivibrator 205 being so chosen that the duration of the pulse of curve Q2 equals eleven complete line-trace intervals. Of course, the other multivibrators 201–204 and 206–215 are also constructed in the same manner as multivibrator 205 but they do not produce pulses in the illustrated case since they receive no actuating pulses like that shown in curve W1.

The pulse of curve Q2 opens normally-closed gate circuit 255 which is also supplied with the pulse of curve L2 in order to produce that pulse of curve L2 at its output terminals. A pulse (curve L2) has now been selected which represents either operating state five or state thirteen, since multivibrator 213 is also connected to gate 255. The control signal for operating state thirteen is 180° out of phase with that for operating state five, as may be evidenced by comparing curves 5′ and 13′. This ambiguity will be resolved later in determining that operating state five is actually that in which the receivers should be placed.

Reference will now be made to the manner in which the transition from one operating state to another is achieved while introducing a random aspect to enhance the system security. Mono-stable multivibrator 448 (FIGURE 5) is triggered with the field-drive pulse of curve A1 to produce the elongated pulse of curve R2 which has a trailing edge occurring during the 10th line-trace interval from the leading edge of the pulse of curve Q2, the latter coinciding with the start of the state-determining interval, for reasons which will become apparent later. Multivibrator 449 responds to the trailing edge of the pulse of curve R2 to produce the pulse of curve S2 having a duration of one line trace. This pulse is utilized in turn to open normally-closed gate circuit 450, which is also supplied with line-drive pulses of curve D1, to accept only the one line-drive pulse shown in curve T2 for application to $f_7$ generator 451 along with the pulse of curve T1 from multivibrator 123 (FIGURE 3). The pulses of curves T1 and T2 actuate generator 451 to produce respective bursts of signal frequency $f_7$. Generator 451 as well as each of generators 331–336 includes a cycling or timing feature in the manner of a blocking oscillator or a mono-stable multivibrator to determine the duration of the interval during which the generator is energized in order that the output obtained therefrom may have a selected duration, exceeding the duration of the triggering pulse and slightly less than the time separation of successive line-drive pulses.

To develop additional code bursts, the line-drive pulses of curve D1 are slightly delayed in delay line 282, for reasons which will become obvious later, to produce the pulses of curve V2 for application to random pulse generator 284. In the meantime, mono-stable multivibrator 285 operates in response to the trailing edge of the pulse of curve Z1 from multivibrator 261 (FIGURE 4) to produce the pulse of curve W2 for application to generator 284 to render it operative throughout the first eight line-trace intervals of the state-determining interval. Multivibrator 285 is so designed that its trailing edge occurs during the ninth line trace following the commencement of the state-determining interval. It will later be shown that a space of one line trace is required after the introduction of randomness to provide for further measures to insure that the code pattern produced represents operating state five and not thirteen.

Meanwhile, 8:1 blocking oscillator 279 operates in response to both the line-drive pulses of curve D1 and the pulse of curve L2, the latter pulse serving as a reset pulse, to produce the pulses of curve X2 at its output. It will be noted from an examination of curve X2 that oscillator 279 is initially operating at its normal cyclic 8:1 count down rate but at the occurrence of the pulse of L2 it is immediately reset to produce an output pulse. The oscillator then resumes its usual 8:1 operation but the occurrence of its output pulses is established by the phasing of the reset pulse, and in the case illustrated this reset pulse is that of curve L2.

The output pulses X2 from blocking oscillator 279, as well as the pulses developed by generator 284 which are routed through gates 293–298, switches 301–306, and switching mechanism 315 in a manner to be described, are impressed on selected input circuits of bi-state multivibrator 280. Assuming that the pulses of curve X2 are applied to the C input circuit of multivibrator 280, it is essential that no other input pulses be supplied to its other input circuits, $R_1$ and $R_2$, during the occurrence of such X2 pulses; otherwise a conflict may result form the simultaneous application of pulses to two inputs. To achieve this, the pulses of curve X2 are applied to monostable multivibrator 286 which produces the pulses of curve Y2 each of which has a duration embracing one of the delayed line-drive pulses of curve V2. Accordingly, random pulse generator 284 is inhibited, or rendered inoperative, at those times.

Generator 284 operates in the manner described in the copending application of Carl G. Eilers et al., Serial No. 463,702, to supply the delayed line-drive pulses of curve V2 occurring within the interval of the conditioning pulse of curve W2, with the exception of those that have been inhibited by the pulses of curve Y2, to its various output circuits 287–292 with a random distribution. It will be assumed for purposes of illustration that the pulses of curves A3–F3 appear on conductors 287–292, respectively. These pulses are channeled by way of normally-open gate circuits 293–298 to stationary contacts 306*a*, 305*a*, 304*a*, 302*a*, 301*a* of switches 306–301, respectively.

Switches 301–306 may be adjusted in accordance with any pattern for a given program so long as two conditions are satisfied. Firstly, the movable contact of one of the switches must be connected to the *e* contact in order to insure that a reset is provided for the 8:1 blocking oscillator in the receivers, and secondly at least one of the movable contacts of the switches must be connected to its associated *d* contact to provide for a triggering pulse to the common C input of the bi-stable multivibrators at the receivers or, alternately, two of the movable contacts must be connected to the *c* and *b* contacts, respectively, to provide for triggering pulses to the $R_1$ and $R_2$ input circuits of the bi-stable multivibrators. Since the *e* contacts control the resetting of the 8:1 blocking oscillator, the *d* contacts control the common C input, the *c* contacts control the $R_1$ input, and the *b* contacts control the $R_2$ input, the common conductors connected to those contacts of all the various switches 301–306 are labeled accordingly adjacent switch 301. The *a* contact is used to introduce additional randomness and is not utilized to control the bi-stable multivibrator. Such restrictions are necessary in the present embodiment in order that the 8:1 blocking oscillators and bi-stable multivibrators at all of the receivers may be controlled to establish the receiver in the desired operating state.

With the particular illustrated arrangement shown in the drawing for switches 301–306 and also 441–446, the pulses of curve F3 are channeled by way of movable contact 441*a* of switch 441 to input circuit 321 of switch mechanism 315. In similar manner, the pulse of curve E3 is translated via contacts 302*a* and 302*f* of switch 302 to input circuit 322 of switching mechanism 315. The pulse of curve D3 is applied to input circuit 323 of switching mechanism 315 by way of contacts 303*a* and 303*f* of switch 303; the pulse of curve C3 is applied to input circuit 324 through contacts 304*a* and 304*f* of switch 304; and the pulse of curve A3 is translated via contacts 306*a* and 306*f* of switch 306 to input circuit 326 of switching mechanism 315. Since movable contact 305*f* of switch 305 is connected to its *e* contact, which controls the resetting of the 8:1 blocking oscillators and which is controlled by the pulse of curve L2, and since movable contact 445*a* of switch 445 is connected to an open contact, the pulse of curve *B*3 is not used.

Switching mechanism 315 may be adjusted in accordance with any one of a multiplicity of different switching patterns, thus providing for further enhancement of the security of the system against unauthorized appropriation of the coded intelligence. The only one restriction is that the switching pattern employed must establish input circuit 321, which is connected to movable contact 301*f*, in contact with the common input C of bi-stable multivibrator 280, since switch 301 has been adjusted to its common contact 301*d*. If none of switches 301–306 is adjusted to its *d* contact, two of the switches must be connected to their *c* and *b* contacts respectively and the switching pattern of device 315 must be selected to route the associated pulses to the $R_1$ and $R_2$ inputs, in order that unambiguous control may be maintained for bi-stable multivibrator 280.

Input circuits 321–324 and 326 of switching mechanism 315 are connected to output circuits 327–329 as shown by the dashed construction lines, by way of example, within block 315. It will be noted that input circuit 321 is connected to output circuit 328 which in turn is connected to the common input C of multivibrator 280. Input circuit 325 is not connected to any of the output circuits since it carries only the reset pulses L2 for the 8:1 blocking oscillator.

Bi-stable multivibrator 280 operates in response to the pulses of curve X2 from blocking oscillator 279, which are applied to its C input and also in response to the pulses of curves A3, C3, D3, E3 and F3 which are connected respectively to its C input circuit, its $R_1$ input, $R_2$ input, $R_1$ input and C input circuit. The multivibrator is triggered back and forth in response to all these various input pulses to produce the signals of curves G3 and H3 at the anodes of its two triodes. It will be noted that the pulse of curve L2 determines the timing of the X2 pulses and hence the amplitude excursions of the signals of curves G3 and H3 subsequent to the termination of the pulses of curves A3–F3. However, since multivibrator 280 may be in either of its two conditions it is now necessary to resolve the previously mentioned ambiguity between states five and thirteen and determine whether, upon the termination of the pulses of curves A3–F3, the multivibrator is in the condition wherein waveform H3 corresponds to the selected control signal 5′ during the ensuing field-trace interval. The amplitude excursions of wave forms G3 and H3, subsequent to the pulses of curves A3–F3, occur one full line-trace interval preceding the amplitude excursions of the control signal of curve 5′ for reasons which will become apparent later.

In order to place multivibrator 280 in the proper condition if it is not already there, mono-stable multivibrator 478 (FIGURE 4) responds to the field-drive pulse of curve A1 to produce the elongated pulse of curve J3, the trailing edge of which occurs approximately one-half line trace after the occurrence of the pulse of curve D3, which is the last pulse produced by random pulse generator 284 during the illustrated field-retrace interval. Monostable multivibrator 479 responds to the trailing edge of the pulse of curve J3 to produce the sharply defined pulse of curve K3 for application through normally-open gate circuit 477 to both normally-closed gate circuits 453 and 454. Meanwhile, the wave forms of curves G3 and H3 are applied to gates 453 and 454, respectively. Each one of gates 453, 454 opens in response to the most positive signal level of the signal supplied from bi-stable multivibrator 280 and thus only gate 454 is in its open condition, due to the relatively high amplitude level of the signal of curve H3, during the occurrence of the pulse of curve K3.

The pulse of curve K3 is thus supplied to mono-stable multivibrator 456 which triggers in response thereto to produce the pulse of curve L3, which is approximately one line trace in duration, for application to normally-closed gate circuit 458 to serve as a gating signal therefor. Gate 458 is also supplied with the line-drive pulses of curve D1 so that the single pulse of curve M3 is gated in by the pulse of curve L3 for translation to normally-closed gate circuit 460. In the meantime, the pulse of curve Q2, which has been applied to OR gate 259 from multivibrator 205, is produced at the output of unit 259 for translation to gate 460 to render the gate effective for translating the pulse of curve M3 through buffer amplifier 465 to movable contact 463 of switch 312.

OR gates 259 and 260 are so wired to multivibrators 201–216 that a pulse appearing on any input circuit is translated unchanged to the output circuit of the associated OR gate. Thus, a pulse appears in the output circuit of unit 259 when any of operating states 2–9 is the desired one for the ensuing field-trace interval, whereas OR gate 260 produces a pulse when any of operating states 1 and 10–16 is the operating state to which the system should be conditioned.

It will be remembered that the pulse of curve L2 actually establishes the timing of the amplitude excursions of the signals of curves G3 and H3 produced in the outputs of multivibrator 280 throughout the field-trace interval following the designated state-determining interval, but it is essential that multivibrator 280 be placed in a predetermined one of its two operating conditions in order to make the selection between operating states five and thirteen. In order for the signal of curve H3 to actually represent operating state five, and thus the control signal of curve 5′, subsequent to the termination of the state-determining interval, the signal of curve H3 is effectively sampled to determine whether or not it is of the correct phase, the phase being compared to that of the signal of curve 5 at time *t*. Actually, the instant during which the signal of curve H3 is sampled occurs one line trace before time *t* in order that the system may be conditioned properly if correction is necessary.

It will be noted from an examination of curves 1–16 at time *t* that one group of curves 2–9, representing operating states 2–9, are all at their lowermost amplitude level, whereas the remaining group of wave forms 1 and 10–16, representing operating state 1 and 10–16, are all at their uppermost or most positive amplitude level. It will also be noted that the input circuits of OR gates 259 and 260, connected to multivibrators 201–216, are correspondingly grouped so that the output signal from these units designates the group 2–9 or 1, 10–16 of which the selected control signal is a member. The pulse of curve Q2, applied to normally-closed gate circuit 460, effectively indicates that the selected control signal at time *t* is at its lowermost potential level. If the signal of curve H3 is not at its lowermost amplitude level one full line trace before time *t*, it will be actuated so that it is, as will be described in the case presented in the illustrative example.

Switches 308, 312 and 310 are connected in a manner dependent on the adjustment of switches 301–306. It has been mentioned that in order to maintain complete control of multivibrator 280 and corresponding multivibrators at the various receivers, it is necessary to provide signal pulses to either the common C input of each such multivibrator or to both of the $R_1$ and $R_2$ inputs; in the former case switch 312 is closed and switches 308 and 310 are opened, while in the latter the conditions of these switches are reversed. In the specific operating example under consideration, the requirement for synchronization has been satisfied by connecting movable contact 301*f* of switch 301 to its *d* contact. Thus, movable contact 463 of switch 312 is positioned to stationary contact 311 which is connected to the contact 301*d* of switch 301. Switches 308 and 310 are in their open positions because input circuits $R_1$ and $R_2$ are not used for control.

Accordingly, the pulse of curve M3 is permitted to pass through gate 460 which is opened by the pulse of curve Q2 indicating that wave form H3 should be at its uppermost amplitude level at that time. The pulse of curve M3 is thus conveyed by way of movable contact 463 of switch 312, contacts 301*d* and 301*f* to input circuit 321 of switching mechanism 315. Since this input circuit is connected to the common C input circuit of multivibrator 280, the multivibrator will be triggered to its opposite condition in response to the pulse of curve M3 and wave form H3 therefore undergoes an amplitude excursion at that time to its lowermost level. The wave form of curve H3 following the conclusion of the state-determining interval now corresponds to the control signal of curve 5′, except that the amplitude excursions occur one line trace earlier for reasons which will become apparent.

Generators 331–336 are actuated in response to the pulses of curves F3, E3, D3, C3, L2 and A3, respectively, to produce signal bursts of frequencies $f_1$–$f_6$. Generator 331 is also triggered by the pulse of curve M3. The output signal of generators 331–336 and also generator 451 is shown in curve N3 since the output circuits of all the generators are connected in common.

Thus, the code signal of wave form N3 has a code pattern, namely the particular distribution and sequence of the various bursts, which represents a transition from the antecedent operating state to operating state five. It should be apparent that this same transition may be represented by a multiplicity of other code signals having different arrangements of signal bursts and thus different code patterns. This follows since, with the exception of the burst of frequency $f_5$ which is initiated by the pulse of curve L2 and the $f_7$ bursts, the signal components appear essentially at random. The last $f_1$ burst is added since upon the termination of the pulses of curves A3–F3, bi-stable multivibrator 280 was found to be not in the operating condition in which it must be placed to represent operating state five. Of course, if multivibrator 280 had been in the correct operating condition the last burst of frequency $f_1$ would not have been produced.

It will now be shown how the code signal of curve N3 is utilized to actually place the transmitter and the various receivers in operating state five.

A video signal representing the picture information to be televised is developed in the picture converting portion of block 485 (FIGURE 6), amplified in video amplifier 486, and translated through video coder 487 to mixer amplifier 488 wherein it is combined with the customary field- and line-synchronizing and blanking pulses from synchronizing-signal generator 24. Mixer 488 develops a composite video signal which is applied to direct-current inserter 489 wherein it is adjusted as to proper background level. The adjusted video signal is then amplitude modulated on a picture carrier in unit 490, and the modulated video carrier is supplied through diplexer 491 to antenna 492 for transmission to subscriber receivers. The sweep systems in unit 485 are synchronized by the field- and line-drive pulses from generator 24 in conventional manner.

The audio information which has been picked-up by the microphone and amplified in audio signal source 87 (FIGURE 2), is delayed for one entire field-trace interval in delay line 495 before it is applied to audio coder 496. It will be remembered that a computation or determination as to the proper operating state which will result in minimum ping distortion in the decoded audio is made after each field-trace interval based on the particular audio intelligence during that preceding interval. Once the determination is made and an incoming signal like that shown in curve N3 is developed to place the transmitter and receivers in that selected operating state, it is essential to delay the audio information for a field-trace interval in order that the same audio information which resulted in the determination of a certain operating state will actually be coded in accordance with that operating state. The output signal from audio coder 496 is applied to unit 497 wherein it is frequency modulated on a sound carrier. This modulated carrier is then applied through diplexer 491 to antenna 492 from which it is concurrently radiated with the modulated video carrier.

The code signal of curve N3 is applied to the filter and rectifier units represented by block 503 and since the individual units are each tuned to an assigned one of the six frequencies $f_1$–$f_6$, such bursts are segregated from one another and rectified to supply the signals of curves P3–U3 to gate circuits 504–509, respectively, to serve as gating signals to gate in the line-drive pulses occurring in time coincidence with each rectified envelope. Consequently, the line-drive pulses of curves V3–Z3 and A4 are applied to the input circuits of switching mechanism 510. It will be noted that the $f_7$ pulses are not utilized in the transmitter since they are only provided to develop a gating signal at the receivers.

Switching mechanism 510 is adjusted in accordance with the particular switching pattern preselected for a given program interval and, as to the routing or channelling of the various frequencies $f_1$–$f_6$ to blocking oscillator 498 and bistable multivibrator 500 which correspond to blocking oscillator 279 and multivibrator 280, corresponds to the switching pattern established by mechanism 315, as shown by the dashed construction lines. Thus, the pulse of curve Z3 is applied to 8:1 blocking oscillator 498 for resetting purposes, the pulses of curves W3 and Y3 are applied to the $R_1$ input circuit of multivibrator 500, the pulses of curve V3 and A4 are applied to the common C input circuit of multivibrator 500, and the pulse of curve X3 is applied to the $R_2$ input circuit of the multivibrator. Blocking oscillator 498 operates in cyclic manner in response to the line-drive pulses of curve D1 and is reset by the pulse of curve Z3 to produce the output signal of curve B4. Multivibrator 500 operates conjointly from the pulses of curve B4 and from those of curves V3, W3, X3, Y3 and A4 to produce the signal wave form C4 for application to normally-open gate circuit 501. Since the operating state selected was determined on the basis that there would be no amplitude excursions of the control signal during the time interval represented by the pulse of curve R1, that pulse is applied to gate 501 to render it inoperative during that interval so that the signal of curve D4 is produced at the output of gate 501 and is applied to video coder 487 and audio coder 496 to effect video and audio coding. The beam of the beam-deflection tube in the video coder switches back and forth between its two collector anodes in accordance with the code schedule represented by the amplitude excursions of wave form D4. This actuation of coder 487 varies the operating mode of the transmitter by modifying the time relation between the video and synchronizing components of the radiated signal and provides effective picture scrambling or coding.

Audio coder 496 is likewise actuated in response to each amplitude excursion of wave form D4 to effect phase inversions of the audio signal to accomplish sound scrambling. From an examination of the signal of curve D4 subsequent to the state-determining interval, it will be observed that the amplitude excursions occur in exact time coincidence with those of control signal 5′ and thus the transmitter has been effectively placed in operating state five for the entire field-trace interval succeeding the field-retrace interval represented in the wave forms. It should now be apparent why the amplitude excursions of wave form H3 occur one line trace preceding the corresponding excursions in wave forms D4 and 5′. This obtains since responsive to triggering of multivibrator 280, a selected one of generators 331–336 is operated which results in the gating in of a line-drive pulse one line trace later for application to the corresponding bi-stable multivibrator 500. Consequently, multivibrator 500 produces the same wave shape as that produced by multivibrator 280 but is effectively delayed a complete line trace.

The code signal of curve N3, without alteration or transposition, is transmitted to subscriber receivers along with the composite video signal as a modulation component of the radiated carrier wave in order to control the decoding apparatus in the receiver. It is, of course, expedient to transmit the signal bursts of curve N3 in unaltered form since, because of the transposition feature, they do not reveal the manner in which the corresponding blocking oscillator and bi-stable multivibrator at each receiver must be actuated during each field-retrace interval. Accordingly, the code signal of wave form N3 is applied to mixer amplifier 488 wherein the unaltered code bursts are added to the video signal during the field-retrace interval.

By way of summary, a code signal generator is provided for producing a code signal (curve N3) for a secrecy communication system (a transmitter and/or receiver) to establish the system in a selected one of several, specifically sixteen, possible operating states, designated 1–16, as determined by the code pattern of the code signal of curve N3, namely by the distribution of the various burst frequencies. The generator has a source of intelligence signal in the form of audio signal source 87. Gate circuits 61–76 and the circuitry connected thereto constitute means for developing several different control signals 1′–16′ each of which represents an assigned one of the several operating states 1–16 of the transmitter. Coders 71–86 may be considered means for simultaneously utilizing control signals 1′–16′ to code the audio intelligence signal to develop several differently coded intelligence signals each of which is coded in accordance with a respective one of the operating states and each of which contains a corresponding characteristic or signal or unidirectional component (D.C. component) having a unique predetermined magnitude-polarity condition. Control circuits 91–106, blocking oscillators 111–126, binaries 161–176, gate circuits 181–196, and the circuitry connected thereto constitute means for determining which of the coded intelligence signals from coders 71–86 contains the common signal component having a magnitude closest to a predetermined reference magnitude but of opposite polarity with respect thereto to provide a control effect (the pulse of curve W1) representing or indicating the selected coded intelligence signal; in the illustrative example, the selected coded intelligence signal is that from coder 75 which is coded in accordance with operating state five. It will be recalled that not always is it desirable to select the coded audio signal having the smallest absolute D.C. component because of the "past history" effect, i.e., because the coupling networks in the receivers may already be charged to some D.C. reference potential which it is desired to cancel out as soon as possible. Finally, the code signal generator includes means, which may be considered all of the circuitry in FIGURES 4 and 5, for utilizing the control effect (wave form W1) to develop a code signal (curve N3) having a code pattern representing the operating state five according to which the selected coded intelligence signal is coded.

Of course, while the system has been described as having only sixteen operating states, it should be appreciated that the system may easily be modified to exhibit many more operating states, for example, thirty-two. In fact, the employment of more than sixteen operating states results in improved operation since the D.C. component of the selected coded audio would then have a magnitude closer to the reference magnitude.

In the operation of the receiver of FIGURE 9, the coded television signal is intercepted by antenna 521, amplified in the radio-frequency amplifier, and heterodyned to the selected intermediate frequency of the receiver in the first detector, and the resulting intermediate-frequency signal is amplified in the intermediate-frequency amplifier of unit 520. The output of the intermediate-frequency amplifier is detected in second detector 522 to produce the coded composite video signal. This latter signal is amplified in video amplifier 523, decoded in video decoder 524 and impressed on the input electrodes of the image reproducer included in block 525 to control the intensity of the cathode-ray beam of the reproducing device in well known manner. The synchronizing components are separated in separator 527 and are utilized to synchronize the operation of the field- and line-sweep systems associated with the image reproducer and included within unit 525.

An intercarrier sound signal is developed in detector 522 and separated from the video in amplifier 523 in accordance with conventional practices. The intercarrier signal is amplified, amplitude limited and detected in unit 528, amplified in audio amplifier 529 to develop a coded audio signal having a phase inversion for each amplitude variation of the control signal of curve D4. This coded audio is decoded by decoder 530 and applied to speaker 531.

Decoding at the receiver is accomplished in the identical manner explained hereinbefore in connection with the coding operation at the transmitter; accordingly, the wave forms are illustrative of receiver as well as transmitter operation and corresponding letter designations are assigned to the receiver diagram of FIGURE 9 where appropriate. Briefly, the filter and rectifier units 503' separate the code signal of curve N3 from the video signal and also segregate the individual bursts from each other in essentially the same manner as unit 503 in the transmitter. Switching mechanism 510' is sdjusted to the same setting as its corresponding mechanism at the transmitter, assuming that the subscriber has been apprised of the correct switch setting information, and thus blocking oscillator 498' and bi-stable multivibrator 500' receive the same pulses as corresponding oscillator 498 and multivibrator 500, namely the pulses of curves V3–A4, to produce the signal of wave form C4 at the output of multivibrator 500'.

In order to delete the amplitude excursions occurring during the time interval of pulse R1, the $f_7$ filter and rectifier in block 503' responds to the two $f_7$ bursts of the signal of curve N3 to produce the rectified pulses of wave form E4 for application to gate circuit 535 wherein the line-drive pulses of curve F4 are gated in to actuate bi-stable multivibrator 536 and produce the pulse of wave form G4. Bi-stable multivibrator 536 receives field-drive pulses, such as the one shown in curve A1, in order to insure that it is placed in a predetermined reference condition before the occurrence of the first pulse of curve F4. In this way, the pulse of curve G4 will always be of proper polarity.

It will be noted that wave forms G4 and R1 are exactly identical and thus when the former signal is applied to normally-closed gate circuit 501' the signal of wave form C4 is converted to that shown in curve D4 in the same manner as at the transmitter. Consequently, the signal of curve D4 is applied to video decoder 524 to effect compensating mode changes in the video signal in exact time coincidence with the mode changes at the transmitter and is also applied to audio decoder 530 to phase invert the coded audio signal in order that corresponding phase inversions may be made of the coded audio in exact time synchronism with the inversions introduced at the transmitter to provide a signal for speaker 531 that is completely unscrambled.

In describing the operation of the system it has been assumed for purposes of illustration that operating state five is the desired one in which the transmitter should be placed for the field-trace interval considered in order to produce a coded audio signal with minimum ping distortion. However, since essentially ten line trace intervals are utilized to place multivibrator 280 in its proper operating condition and thus to develop the proper code signal and since blocking oscillator 279 normally produces pulses after each eight line-trace intervals, a problem is presented when it is required to place the transmitter in either operating state two or state ten. This follows inasmuch as in that case the pulse of curve H2 would be developed at the common output of gates 251–258 and would reset blocking oscillator 279 at that time. The oscillator would then produce a pulse after its normal cycle and that would occur in time coincidence with the pulse of curve M3. Obviously, if a pulse like that shown in M3 is applied to the common input of multivibrator 280 at the time a pulse is received from blocking oscillator 279, confusion will arise and the multivibrator may or may not be actuated. Consequently, when it is desired to place the transmitter in operating state two or ten the examination of curves H3 and G3, to determine whether multivibrator 280 is in the proper operating condition following the random pulses, must be made one line trace earlier than that time indicated by the occurrence of the pulse of curve K3.

To this end, and assuming that the pulse of curve H2 is developed at the output of gates 251–258 and is applied to normally-closed gate 472, mono-stable multivibrator 470 responds to the field-drive pulse of curve A1 to produce the pulse of curve H4. The circuit components of multivibrator 470 are selected so that the trailing edge of that pulse occurs approximately ½ line trace before the occurrence of the pulse of wave form H2. Mono-stable multivibrator 471 responds to the trailing edge of the pulse of wave form H4 to produce the pulse of curve J4 having a duration of approximately one line trace. This pulse is utilized to open gate 472 and accept the pulse of curve H2 which in turn is applied to mono-stable multivibrator 473 in order to produce the pulse of wave form K4. This multivibrator is so constructed that the trailing edge of its output pulse occurs one line-trace interval before the occurrence of the pulse of curve K3. Multivibrator 474 responds to the trailing edge of the pulse of curve K4 to produce the sharply defined pulse of curve L4, which of course occurs one line trace before the pulse of curve K3, for application to gates 453 and 454 as a substitute for the K3 pulse.

In order to prevent the translation of the pulse of curve K3 to gates 453 and 454 when either operating states two or ten is selected, mono-stable multivibrator 475 responds to the pulse of curve L4 to produce the pulse of curve M4 which is applied to normally-open gate 477 to render it ineffective to translate the K3 pulse. The pulse of wave form M4 is also supplied to each of gates 293–298 to close them during the time interval of that pulse so that no triggering pulses will be applied to multivibrator 280.

The remaining circuitry functions exactly as described hereinbefore when operating state five was desired except that multivibrator 280 is effectively read or examined during the occurrence of the pulse of curve L4 rather than at the time represented by the pulse of curve K3. With this arrangement, blocking oscillator 279 may supply pulses to multivibrator 280 without the possibility of a conflicting pulse being applied thereto over one of its other input circuits.

Certain features described in the present application are disclosed and claimed in copending applications Serial Nos. 281,418, filed April 9, 1952, and issued July 15, 1958, as Patent 2,843,656; 291,714, filed June 4, 1952, and issued April 21, 1959, as Patent 2,883,449; 310,309, filed September 18, 1952; 326,107, filed December 15, 1952, and issued Feb. 11, 1958, as Patent 2,823,252; 366,727, filed July 8, 1953, and issued Sept. 16, 1950, as Patent 2,852,598; 370,174, filed July 24, 1953, and issued October 27, 1959, as Patent 2,910,526; and 829,106, filed July 23, 1959, all of which are assigned to the present assignee.

The invention provides, therefore, a code signal generator for producing a code signal which when utilized at the transmitter to achieve audio coding results in the introduction of a minimum D.C. component and thus minimum ping distortion.

While a particular embodiment of the invention has been shown and described, modifications may be made, and it is intended in the appended claims to cover all such modifications as may fall within the true spirit and scope of the invenion.

I claim:

1. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which contains a corresponding signal component having a unique predetermined magnitude-polarity condition; means for selecting the one of said coded intelligence signals in which said corresponding signal component is of a magnitude closest to a predetermined reference magnitude but of opposite polarity with respect thereto and for providing a control effect representing the selected coded intelligence signal; and means for utilizing said control effect to develop a code signal having a code pattern representing the operating state according to which the selected coded intelligence signal is coded.

2. A code signal generator for producing a code signal for a secrecy communication system to establish said system in a selected one of several possible operating states as determined by the code pattern of said code signal, said generator comprising: a source of intelligence signal; means for developing several different square wave shaped control signals respectively exhibiting unique phase conditions with respect to each other to represent respective assigned ones of said several operating states of said system; means for simultaneously utilizing said square wave shaped control signals to code said intelligence signal to develop several differently coded intelligence signals each of which is coded in accordance with a respective one of said operating states and each of which contains a corresponding signal component having a unique predetermined magnitude-polarity condition; means for selecting the one of said coded intelligence signals in which said corresponding signal component is of a magnitude closest to a predetermined reference magnitude but of opposite polarity with respect thereto and for providing a control effect representing the selected coded intelligence signal; and means for utilizing said control effect to develop a code signal having a code pattern representing the operating state according to which the selected coded intelligence signal is coded.

3. A code signal generator for producing a code signal for a secrecy communication system to establish said system in a selected one of several possible operating states as determined by the code pattern of said code signal, said generator comprising: a source of intelligence signal; means for developing several different square wave shaped control signals having the same common frequency and each having periodically recurring amplitude variations exhibiting a unique phase condition with respect to the amplitude variations of the other control signals to represent an assigned one of said several operating states of said system so that the corresponding amplitude variations of all of said control signals occur at different times; means for simultaneously utilizing said control signals to code said intelligence signal to develop several differently coded intelligence signals each of which is coded in accordance with a respective one of said operating states and each of which contains a corresponding signal component having a unique predetermined magnitude-polarity condition; means for selecting the one of said coded intelligence signals in which said corresponding signal component is of a magnitude closest to a predetermined reference magnitude but of opposite polarity with respect thereto and for providing a control effect representing the selected coded intelligence signal; and means for utilizing said control effect to develop a code signal having a code pattern representing the operating state according to which the selected coded intelligence signal is coded.

4. A code signal generator for producing a code signal for a secrecy communication system to establish said system in a selected one of several possible operating states as determined by the code pattern of said code signal, said generator comprising: a source of intelligence signal; means for developing several different square wave shaped control signals having the same common frequency and each having periodically recurring amplitude variations exhibiting a unique phase condition with respect to the amplitude variations of the other control signals to represent an assigned one of said several operating states of said system so that the corresponding amplitude variations of all of said control signals occur at different times; means for simultaneously utilizing said square wave shaped control signals to phase invert said intelligence signal to develop several differently coded intelligence signals each of which is coded in accordance with a respective one of said operating states, in that each exhibits phase inversions occurring at different times, and each of which contains a corresponding signal component having a unique predetermined magnitude-polarity condition; means for selecting the one of said coded intelligence signals in which said corresponding signal component is of a magnitude closest to a predetermined reference magnitude but of opposite polarity with respect thereto and for providing a control effect representing the selected coded intelligence signal; and means for utilizing said control effect to develop a code signal having a code pattern representing the operating state according to which the selected coded intelligence signal is coded.

5. A code signal generator for producing a code signal for a secrecy communication system to establish said system in a selected one of several possible operating states as determined by the code pattern of said code signal, said generator comprising: a source of audio signal; means for developing several different control signals each of which represents an assigned one of said several operating states of said system; means for simultaneously utilizing said control signals to code said audio signal to develop several differently coded audio signals each of which is coded in accordance with a respective one of said operating states and each of which contains a unidirectional component having a unique predetermined magnitude-polarity condition; means for selecting the one of said coded audio signals in which said unidirectional component is of a magnitude closest to a predetermined reference magnitude but of opposite polarity with respect thereto and for providing a control effect representing the selected coded audio signal; and means for utilizing said control effect to develop a code signal having a code pattern representing the operating state according to which the selected coded audio signal is coded.

6. A code signal generator for producing a code signal for a secrecy communication system to establish said system in a selected one of several possible operating states as determined by the code pattern of said code signal, said generator comprising: a source of audio signal; means for developing several different control signals each of which represents an assigned one of said several operating states of said system; means for simultaneously utilizing said control signals to code said audio signal to develop several differently coded audio signals each of which is coded in accordance with a respective one of said operating states and each of which contains a unidirectional component having a unique predetermined magnitude; means for selecting the one of said coded audio signals in which said unidirectional component is of the least amplitude and for providing a control effect representing the selected coded audio signal; and means for utilizing said control effect to develop a code signal having a code pattern representing the operating state according to which the selected coded audio signal is coded.

7. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; a plurality of coding devices each of which is coupled to said source; means for applying each of said control signals to an assigned one of said coding devices to develop in said coding devices differently coded intelligence signals each of which is coded in accordance with a respective one of said operating states and each of which contains a corresponding signal component having a unique predetermined magnitude-polarity condition; means for selecting the one of said coded intelligence signals in which said corresponding signal component is of a magnitude closest to a predetermined reference magnitude but of opposite polarity with respect thereto and for providing a control effect representing the selected coded intelligence signal; and means for utilizing said control effect to develop a code signal having a code pattern representing the operating state according to which the selected coded intelligence signal is coded.

8. A code signal generator for producing a code signal for a secrecy communication system to establish said system in a selected one of several possible operating states as determined by the code pattern of said code signal, said generator comprising: a source of intelligence signal; a plurality of counting mechanisms; means for differently cyclically actuating said mechanisms to develop several different control signals each of which represents an assigned one of said several operating states of said system; means for simultaneously utilizing said control signals to code said intelligence signal to develop several differently coded intelligence signals each of which is coded in accordance with a respective one of said operating states and each of which contains a corresponding signal component having a unique predetermined magnitude-polarity condition; means for selecting the one of said coded intelligence signals in which said corresponding signal component is of a magnitude closest to a predetermined reference magnitude but of opposite polarity with respect thereto and for providing a control effect representing the selected coded intelligence signal; and means for utilizing said control effect to develop a code signal having a code pattern representing the operating state according to which the selected coded intelligence signal is coded.

9. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which contains a unidirectional component having a unique predetermined magnitude-polarity condition; means for effectively comparing the unidirectional component of each of said coded intelligence signals with a reference potential to determine the one having a magnitude closest to the reference magnitude but of opposite polarity with respect thereto; means for providing a control effect representing the selected coded intelligence signal; and means for utilizing said control effect to develop a code signal having a code pattern representing the operating state according to which the selected coded intelligence signal is coded.

10. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which contains a unidirectional component having a unique predetermined magnitude-polarity condition; means for providing several different control potentials having amplitudes and polarities corresponding to the magnitudes and polarities of the unidirectional components of respective ones of said several coded intelligence signals; means for providing a reference potential exhibiting a reference magnitude and polarity; means, including means for comparing said reference potential with each of said control potentials, for determining which control potential has a magnitude closest to said reference magnitude but has a polarity opposite to that of said reference potential; means for providing a control effect representing the coded intelligence signal assigned to the selected control potential; and means for utilizing said control effect to develop a code signal having a code pattern representing the operating state according to which the coded intelligence signal assigned to the selected control potential is coded.

11. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal during a predetermined time interval to develop several differently coded intelligence signals each of which is coded in accordance with a respective one of said operating states and each of which contains a unidirectional component having a predetermined average magnitude of a predetermined polarity during said time interval; means for developing several different control potentials having amplitudes and polarities corresponding to the average magnitudes and polarities of the unidirectional components of respective ones of said several coded intelligence signals; means for providing a reference potential exhibiting a reference magnitude and polarity; means, including means for comparing said reference potential with each of said control potentials subsequent to said predetermined time interval, for determining which control potential has an average magnitude closest to said reference magnitude but has a polarity opposite to that of said reference potential; means for providing a control effect representing the coded intelligence signal assigned to the selected control potential; and means for utilizing said control effect to develop a code signal having a code pattern representing the operating state according to which the coded intelligence signal assigned to the selected control potential is coded.

12. A secrecy communication transmitter for coding an intelligence signal before transmission to a companion receiver, comprising: means for developing several different control signals each of which represents an assigned one of several operating states of said transmitter; means for simultaneously utilizing said control signals to code said intelligence signal during a predetermined time interval to develop several differently coded intelligence signals each of which is coded in accordance with a respective one of said operating states and each of which contains a unidirectional component having a predetermined average magnitude of a predetermined polarity during said time interval; means for developing several different control potentials having amplitudes and polarities corresponding to the average magnitudes and polarities of the unidirectional components of respective ones of said several coded intelligence signals; means for providing a reference potential exhibitiing a reference magnitude and polarity; means, including means for comparing said reference potential with each of said control potentials subsequent to said predetermined time interval, for determining which control potential has an average magnitude closest to said reference magnitude but has a polarity opposite to that of said reference potential; means for providing a control effect representing the coded intelligence signal assigned to the selected control potential; means for utilizing said control effect to develop a coding signal having a code pattern representing the operating state according to which the coded intelligence signal assigned to the selected control potential is coded; a delay device for delaying said intelligence signal for an interval substantially equal to said predetermined time interval; coding apparatus for establishing said transmitter in a selected one of said several possible operating states as determined by the code pattern of an applied coding signal; means coupling said delay device and said coding-signal-developing means to said coding apparatus for coding said intelligence signal according to the selected operating state; and means coupled to said last-mentioned means for transmitting the coded intelligence signal to said receiver.

13. A subscription television transmitter for coding an audio signal before transmission to a companion receiver, comprising: means for developing several different control signals each of which represents an assigned one of several operating states of said transmitter; means for simultaneously utilizing said control signals to phase invert said audio signal during a predetermined field-trace interval to develop several differently coded audio signals each of which is coded in accordance with a respective one of said operating states and each of which contains a unidirectional component having a predetermined average magnitude of a predetermined polarity during said field-trace interval; means for developing several different control potentials having amplitudes and polarities corresponding to the average magnitudes and polarities of the unidirectional components of respective ones of said several coded audio signals; means for providing a reference potential exhibiting a reference magnitude and polarity; means, including means for comparing said reference potential with each of said control potentials during the field-retrace interval immediately subsequent to said predetermined field-trace interval, for determing which control potential has an average magnitude closest to said reference magnitude but has a polarity opposite to that of said reference potential; means for providing a control effect representing the coded audio signal assigned to the selected control potential; means for utilizing said control effect to develop a coding signal having a code pattern representing the operating state according to which the coded audio signal assigned to the selected control potential is coded; a delay device for delaying said audio signal for an interval substantially equal to a field-trace interval; coding apparatus for establishing said transmitter in a selected one of said several possible operating states as determined by the code pattern of an applied coding signal; means coupling said delay device and said coding-signal-developing means to said coding apparatus for coding said aud io signal according to the selected operating state; and means coupled to said last-mentioned means for transmitting the coded audio signal to said receiver.

14. A code signal generator for use in a subscription television system, including a source of line-synchronizing pulses occurring during line-retrace intervals, for producing a code signal to establish said television system in a selected one of several possible operating states as determined by the code pattern of said code signal, said generator comprising: a source of audio signal; a plurality of counting mechanisms; means coupled to said source of line-synchronizing pulses for differently cyclically actuating said counting mechanism to develop several different square wave shaped control signals having the same common frequency and each having periodically recurring amplitude variations exhibiting a unique phase condition with respect to the amplitude variations of the other control signals to represent an assigned one of said several operating states of said system so that the corresponding amplitude variations of all of said control signals occur during different line-retrace intervals; means for simultaneously utilizing said control signals to phase invert said audio signal to develop several differently coded audio signals each of which is coded in accordance with a respective one of said operating states, in that each exhibits phase inversions occurring during different line-retrace intervals, and each of which contains a unidirectional component having a unique predetermined magnitude-polarity condition; means for selecting the one of said coded audio signals in which said unidirectional component is of a magnitude closest to a predetermined reference magnitude but of opposite polarity with respect thereto and for providing a control effect representing the selected coded audio signal; and means for utilizing said control effect to develop a code signal having a code pattern representing the operating state according to which the selected coded audio signal is coded.

15. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal during spaced first and second time intervals to develop several differently coded intelligence signals each of which is coded in accordance with a respective one of said operating states and each of which contains a unidirectional component having a different predetermined average magnitude of a predetermined polarity during each of said first and second time intervals; means for developing during each of said first and second time intervals several different control potentials having amplitudes and polarities corresponding to the average magnitudes and polarities of the unidirectional components of respective ones of said several coded intelligence signals; means for determining during an interval intervening said first and second time intervals which control potential has the least magnitude; means for storing during said second time interval the control potential selected between said first and second time intervals; means, including means for comparing the stored selected control potential with each of the control potentials developed during said second time interval, for determining which control potential during said second time interval has a magnitude closest to the magnitude of the stored control potential but has an opposite polarity with respect thereto; means for providing one control effect between said first and second time intervals and another control effect subsequent to said second time interval representing the coded intelligence signals respectively assigned to the control potential selected between said first and second time intervals and that selected subsequent to said second time interval; and means for utilizing said two control effects to develop a code signal having a code pattern representing the operating states according to which the coded intelligence signals assigned to the selected control potentials are coded.

16. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which exhibits a corresponding characteristic of a predetermined value; means for selecting the one of said coded intelligence signals which exhibits said corresponding characteristic having a value closest to a predetermined reference value and for providing a control effect representing a selected coded intelligence signal; and means for utilizing said control effect to develop a code signal having a code pattern representing the operating state according to which the selected coded intelligence signal is coded.

17. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which exhibits a corresponding characteristic of a different predetermined value; means for selecting the one of said coded intelligence signals which exhibits said corresponding characteristic having a value closest to zero and for providing a control effect representing the selected coded intelligence signal; and means for utilizing said control effect to develop a code signal having a code pattern representing the operating state according to which the selected coded intelligence signal is coded.

18. A code signal generator for producing a code signal for a secrecy communication system to establish said system in a selected one of several possible operating states as determined by the code pattern of said code signal, said generator comprising: a source of intelligence signals; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which contains a corresponding signal component having a unique predetermined magnitude-polarity condition; means for selecting one from a group of said coded intelligence signals, in each of which said corresponding signal component is of a magnitude lying within a range of magnitudes any one of which is relatively close to a predetermined reference magnitude and of a polarity opposite to that of said reference magnitude, and for providing a control effect representing the selected coded intelligence signal; and means for utilizing said control effect to develop a code signal having a code pattern representing the operating state according to which the selected coded intelligence signal is coded.

19. A secrecy communication system for producing from a given time segment of an uncoded intelligence signal a coded intelligence signal containing a certain signal component and coded in accordance with the one of several possible operating states rendering the magnitude of said certain signal component closest to a predetermined reference magnitude but of opposite polarity with respect thereto, comprising: means for simultaneously coding the given time segment of said uncoded intelligence signal in accordance with each of said several operating states to develop several differently coded intelligence signals each of which is coded in accordance with a respective one of said operating states and each of which contains said certain signal component having a unique predetermined magnitude-polarity condition; means for selecting the one of said several differently coded intelligence signals in which said certain signal component is of a magnitude closest to said predetermined reference magnitude but of opposite polarity with respect thereto; means for developing a code signal having a code pattern representing the operating state according to which the selected coded intelligence signal is coded; means for delaying the given time segment of said uncoded intelligence signal; and means for utilizing said code signal to code the delayed uncoded intelligence signal in accordance with the selected operating state represented by said code pattern.

20. A secrecy communication system for producing from a given time segment of an uncoded intelligence signal a coded intelligence signal coded in accordance with a selected one of several possible operating states and containing a minimum unidirectional component, comprising: means for simultaneously coding the given time segment of said uncoded intelligence signal in accordance with each of said several operating states to develop several differently coded intelligence signals each of which is coded in accordance with a respective one of said operating states and each of which contains a unidirectional component having a unique predetermined magnitude; means for selecting the one of said several differently coded intelligence signals in which said unidirectional component is of the least amplitude; means for developing a code signal having a code pattern representing the operating state according to which the selected coded intelligence signal is coded; means for delaying the given time segment of said uncoded intelligence signal; and means for utilizing said code signal to code the delayed uncoded intelligence signal in accordance with the selected operating state represented by said code pattern.

21. A secrecy communication system for producing from a given time segment of an uncoded audio signal a coded audio signal having a series of phase inversions occurring in accordance with a selected one of seevral possible phase conditions and containing a minimum unidirectional component, comprising: means for simultaneously phase inverting the given time segment of said uncoded audio signal in accordance with each of said several possible phase conditions to develop several differently coded audio signals each of which is coded in accordance with a respective one of said phase conditions and each of which contains a unidirectional component having a unique predetermined magnitude; means for selecting the one of said several differently coded audio signals in which said unidirectional component is of the least amplitude; means for developing a code signal having a code pattern representing the phase condition according to which the selected coded audio signal is coded; means for delaying the given time segment of said uncoded audio signal; and means for utilizing said code signal to code the delayed uncoded audio signal in accordance with the selected phase condition represented by said code pattern.

22. A code signal generator for producing a code signal for a secrecy communication system to establish said system in a selected one of several possible operating states as determined by the code pattern of said code signal, said generator comprising: a source of intelligence signal; means for developing several different control signals each of which represents an assigned one of said several operating states of said system; means for simultaneously utilizing said control signals to code said intelligence signal to develop several differently coded intelligence signals each of which is coded in accordance with a respective one of said operating states and each of which contains a corresponding signal component having a unique predetermined magnitude; means for selecting the one of said coded intelligence signals in which said corresponding signal component is of a magnitude closest to a predetermined reference magnitude and for providing a control effect representing the selected coded intelligence signal; and means for utilizing said control effect to develop a code signal having a code pattern representing the operating state according to which the selected coded intelligence signal is coded.

References Cited in the file of this patent

UNITED STATES PATENTS

| | | |
|---|---|---|
| 2,656,410 | Herrick et al. | Oct. 20, 1953 |
| 2,896,071 | Druz et al. | July 21, 1959 |